United States Patent [19]
Zabih et al.

[11] Patent Number: 5,767,922
[45] Date of Patent: Jun. 16, 1998

[54] APPARATUS AND PROCESS FOR DETECTING SCENE BREAKS IN A SEQUENCE OF VIDEO FRAMES

[75] Inventors: Ramin Zabih, Ithaca, N.Y.; Justin F. Miller, Mystic, Conn.; Kevin W. Mai, Syosset, N.Y.

[73] Assignee: Cornell Research Foundation, Inc., Ithaca, N.Y.

[21] Appl. No.: 628,374

[22] Filed: Apr. 5, 1996

[51] Int. Cl.[6] ................................................. H04N 5/14
[52] U.S. Cl. ........................................... 348/700; 348/699
[58] Field of Search ................................. 348/169–172, 348/384, 390, 400, 402, 407, 409–413, 416, 699–701; H04N 5/14

[56] References Cited

U.S. PATENT DOCUMENTS

| | | | |
|---|---|---|---|
| 4,270,143 | 5/1981 | Morris | 358/125 |
| 4,524,392 | 6/1985 | Poetsch | 358/214 |
| 4,694,329 | 9/1987 | Belmares-Sarabia et al. | 358/22 |
| 4,697,209 | 9/1987 | Kiewit et al. | 358/84 |
| 4,823,184 | 4/1989 | Belmares-Sarabia et al. | 358/27 |
| 4,920,423 | 4/1990 | Shiota | 358/335 |
| 5,099,322 | 3/1992 | Gove | 358/105 |
| 5,103,305 | 4/1992 | Watanabe | 348/700 |
| 5,181,111 | 1/1993 | Hedley et al. | 348/701 |
| 5,241,386 | 8/1993 | Tsuji | 358/166 |
| 5,404,174 | 4/1995 | Sugahara | 348/700 |
| 5,459,517 | 10/1995 | Kunitake et al. | 348/416 |
| 5,471,239 | 11/1995 | Hill et al. | 348/155 |
| 5,479,264 | 12/1995 | Ueda et al. | 348/400 |
| 5,602,594 | 2/1997 | Cho et al. | 348/700 |
| 5,617,150 | 4/1997 | Nam et al. | 348/700 |

OTHER PUBLICATIONS

Ramin Zabih and John Woodfill. Non–parametric local transforms for computing visual correspondence. In Jan–Olof Eklundh, editor, *3rd European Conference on Computer Vision*, number 801 in LNCS, pp. 151–158. Springer–Verlag, 1994.

*Primary Examiner*—Richard Lee
*Attorney, Agent, or Firm*—Hodgson, Russ, Andrews, Woods & Goodyear LLP

[57] ABSTRACT

Apparatus and process for detecting scene breaks in a sequence of video frames providing a moving picture. Entering and exiting edge pixels in each of a plurality of successive video frames are counted, and an edge change fraction for each of the successive video frames is derived therefrom. Peaks which are detected in the edge change fractions are indicative of scene breaks.

24 Claims, 25 Drawing Sheets

APPARATUS AND PROCESS FOR DETECTING SCENE BREAKS IN A SEQUENCE OF VIDEO FRAMES

The present invention relates generally to the processing of video sequences which are viewed as moving pictures. More particularly, the present invention relates to the detection of scene breaks in such sequences.

A scene break is the transition that separates shots from different locations in a segment of video, i.e., the transition between one scene and another, for example, from a table tennis game sequence to an interview with a player. Scene breaks are introduced into video during the editing stage when video clips are assembled to produce the video.

The ability to separate a recorded video sequence into its component video shots is considered to be important for creating efficient and useful video database software. Separating a video into component shots is considered to be a necessary step in performing higher level analysis on the content that is contained in the video. Applications may include, for example, key-framing and increasing the efficiency of video compression.

The goal of key-framing or storyboarding is to create a visual synopsis of a segment of video by extracting certain "key" frames that explain the action occurring in the video. Scene breaks are considered to define important key frames, i.e., by correctly identifying the locations of scene breaks, one can extract the beginning and end of a camera shot. Not only does key-framing provide a good visual synopsis of what is occurring in a video segment, but the key frames can also be used for content based searching and browsing of video. Most algorithms for computing useful measures of the content contained in a section of video are considered to be expensive to compute on a frame-by-frame basis. Good key-framing may allow one to avoid processing each frame in the video. Instead, one need only examine the important frames that summarize the scene. For example, in a static landscape scene that occurs for three seconds in a video, the user may ask whether the scene contains a sunset. Without key-framing, one may have to examine 90 frames of video, but with key-framing, one may only have to examine a single key frame. With good key-framing, one may be able to search videos in a method similar to the way one currently searches the abstracts of technical papers.

Most video compression methods are based on picking a set of frames to store and, for the remaining frames, storing only the changes that occur between frames. The key frames that need to be stored in full may be more efficiently located by the use of shot boundaries. Motion-based compression algorithms like the MPEG (Motion Pictures Expert Group) standard can obtain higher compression rates without sacrificing quality when the locations of scene breaks are known. Thus, the identification of scene breaks may desirably increase the efficiency of video compression techniques.

Scene breaks include cuts, fades, dissolves, and wipes. A cut is an instantaneous transition from one scene to the next. A fade is a gradual transition between a scene and a constant image (fade out) or between a constant image and a scene (fade in). During a fade, the images from the scene have their intensities multiplied by some value $\alpha$. During a fade in, $\alpha$ increases from 0 to 1, while during a fade out, $\alpha$ decreases from 1 to 0. The speed with which $\alpha$ changes controls the fade rates, which is typically constant. A dissolve is a gradual transition from one scene to another, in which the first scene faces out and the second scene fades in. Typically, fade out and fade in begin at approximately the same time. A wipe involves a line moving across the screen; the new scene appears behind it, while in front of it, the old scene remains.

A possible alternative to automatic detection of scene breaks would be for video producers to add such information during the editing process. Scene breaks are a kind of special effect. They are typically added to raw video during post-production, where they are stored in an Edit Decision List (EDL). It is possible that the EDL might be added to the resulting video, which would make it easy to find scene breaks. While this might become a viable approach at some point in the future, there are significant obstacles to be overcome. First, there is an enormous amount of existing video which does not contain EDLs. In addition, new standards would have to be defined in order to encode EDLs in video. These EDLs would need to be encoded in some manner that survived conversion between analog and digital formats, as well as a variety of compression techniques. Since billions of dollars have been invested in hardware that uses current video standards, any new standards would need to be backwards compatible. These factors suggest that encoding EDLs in video is not a viable approach at present.

Previous approaches to detecting scene breaks have relied directly on intensity data and thus are referred to herein as "intensity-based".

Computational schemes for detecting scene breaks have generally defined a similarity measure between consecutive images. When two consecutive images are sufficiently dissimilar, there may be a scene break. Typically, the similarity measure is thresholded, often in combination with a smoothing mechanism to reduce the effects of noise and to prevent the detector from signaling too many scene breaks in a short period of time.

Several methods have been proposed for detecting cuts and dissolves. These methods have relied directly on intensity data, and have used such techniques as image differencing (which subtracts two consecutive images to determine changes in intensity) and intensity histogramming. Most approaches are based on intensity histograms, and concentrate on cuts.

In "Projection-detecting Filter for Video Cut Detection", *Multimedia Systems*, 1:205–210, 1994, by Kiyotaka Otsuji and Yochinoby Tonomura, a variety of measures based on image differencing and changes in the image's intensity histogram are discussed. See also "Automatic Video Indexing and Full-video Search for Object Appearances", in *2nd Working Conference on Visual Database Systems*, October 1991, by Akio Hagasaka and Yuzuru Tanaka. The issue of change detection while operating directly on JPEG (Joint Photographic Experts Group) or MPEG encoded video is addressed in "Image Processing on Compressed Data for Large Video Databases" in *Multimedia Conference*, pages 267–272, ACM, 1993, by Farshid Arman, Arding Hsu and Ming-Yee Chiu.

The above intensity-based methods have difficulty with "busy" scenes, in which intensities change substantially from frame to frame. This change often results from motion, i.e., if the camera is moving, or if an object that occupies much of the image is moving, then many pixels will change their values from frame to frame. Motion can cause intensity-based similarity measures to produce a low similarity score, which can result in a false positive from the detector.

Dissolves are more difficult to detect than cuts, especially if the scenes may involve motion. False positives resulting from motion can be repressed by setting a high threshold. A dissolve, being a gradual change from one scene to another, cannot be easily distinguished from motion. A dissolve which occurs between two scenes which each contain motion is particularly difficult to detect.

In "Production Model based Digital Video Segmentation", *Journal of Multimedia Tools and Applications*, 1:1–38, March 1995, by Arun Hampapur, Ramesh Jain and Terry Weymouth, a method called chromatic scaling is described for attempting to detect a variety of scene breaks based on an explicit model of the video production process. In accordance with this approach, a chromatic image from a pair of consecutive images is computed. Its value at each pixel is the change in intensity between the two images divided by the intensity in the later image. Ideally, the chromatic image should be uniform and non-zero during a fade. This paper proposes to detect dissolves by measuring the uniformity of the chromatic image.

The difficulties caused by motion and dissolves are well-known. For example, Hampapur et al in the above paper note in their discussion of dissolves that their measure "is applicable if the change due to the editing dominates the change due to motion" and describe both object and camera motion as causes of false positives for their method.

In "Automatic Partitioning of Full-motion Video", *Multimedia Systems*, 1:10–28, 1993, by HongJiang Zhang, Atreyi Kankanhalli, and Stephen William Smoliar, motion is described as a major limitation of histogram-based methods. This paper describes the extension of conventional histogram-based approaches to handle dissolves and to deal with certain camera motions. This approach uses a dual threshold on the change in the intensity histogram to detect dissolves. In addition, this paper describes a method for avoiding the false positives that result from certain classes of camera motion, such as pans and zooms. This paper proposes to detect such camera motion and suppress the output of the scene-break measure during camera motion. A local motion computation is used to compute an optical flow field on an image by image basis, and then test if the flow field could result from a camera pan or zoom. This method does not handle false positives that arise from object motion or more complex camera motions. Nor does this method handle false negatives, which would occur in dissolves between scenes involving motion.

U.S. Pat. No. 5,479,264 to Ueda et al discloses an encoder which performs motion-compensation prediction wherein the presence of a scene change is detected by comparing the variance of values of pixels in some predetermined areas of a past image with the variance of values of pixels in some predetermined areas of a currently processed image.

U.S. Pat. No. 5,459,517 to Kunitake et al discloses a moving picture scene detection system utilizing motion compensation wherein the number of significant blocks (an image block of which the data quantity is greatly changed from that of the preceding block) is determined, and the frame in which the number of significant blocks is larger than a threshold value and in which the ratio of intraframe coding significant blocks to other significant blocks is larger than a threshold value is considered to be a scene change frame.

U.S. Pat. No. 5,471,239 to Hill et al discloses the detection of scene changes in a video sequence by generating data representing the amount of information present in each video frame. The data is processed to locate significant changes in the amount of information between frames, the frame position of the significant changes being identified as a frame position of likely scene changes.

U.S. Pat. No. 5,404,174 to Sugahara discloses a scene change detector for a moving picture wherein a scene change is detected when activities (denoting complexity) of succeeding frames differ greatly, an activity being the sum of absolute values of digital picture signals indicating a frame of picture.

U.S. Pat. No. 5,099,322 to Gove discloses a scene change detection system based on analyzing a video image sequence for abrupt frame-to-frame changes in certain image features, i.e., dramatic changes in scene content such as switching from an interview to a cityscape. This reference discusses various algorithms which rely either on a change in one or more of an object's physical features such as light intensity, texture, size, or color or by tracking objects as they move in and out of a scene. These objects may be several areas (detection zones) in the image, or they may be pixel regions which have similar values for one or more physical features. One algorithm may use spatio-temporal analysis, which involves calculating a feature property or motion property at various spatial resolutions for successive frames and doing a frame-to-frame comparison for that property to obtain a temporal variation. The property could be a summation of pixel values for all pixels in a detection zone. In accordance with another exemplary algorithm, a coarse resolution image of a scene is differenced by taking a pixel-to-pixel difference of the detection zones in two successive images followed by a threshold operation, which yields a motion gradient. A large gradient indicates that an object has moved and that a scene change has been detected.

Gove further discloses a scene change algorithm wherein an object detector would not only detect objects but would also compute object segments and label the object and segments, which it does by finding pixel regions in which all pixels have similar values for the desired features. The object detector finds pixel regions by horizontally and vertically scanning adjacent pixels until a pixel has a value which is much greater or smaller than its neighbor, thus indicating the border of a region.

Other art which may be of interest includes U.S. Pat. Nos. 4,270,143; 4,524,392; 4,694,329; 4,697,209; 4,823,184; 4,920,423; and 5,241,386.

The above approaches to scene break detection suffer from various deficiencies including complexities resulting in inefficiencies and/or inaccuracies. For example, in the Gove process, the detection and labeling of objects and segments is burdensome and may result in false positives.

It is accordingly an object of the present invention to detect scene breaks efficiently and accurately.

In order to detect scene breaks efficiently and accurately, in accordance with the present invention an edge change fraction is obtained in each of a plurality of successive video frames by counting entering and exiting edge pixels therein, and peaks indicative of scene breaks are detected in the edge change fractions.

The above and other objects, features, and advantages of the present inventions will be apparent in the following detailed description of the preferred embodiment thereof when read in conjunction with the accompanying drawings wherein like reference numerals denote the same or similar items throughout the several views.

BRIEF DESCRIPTIONS OF THE DRAWINGS

Figure 4:
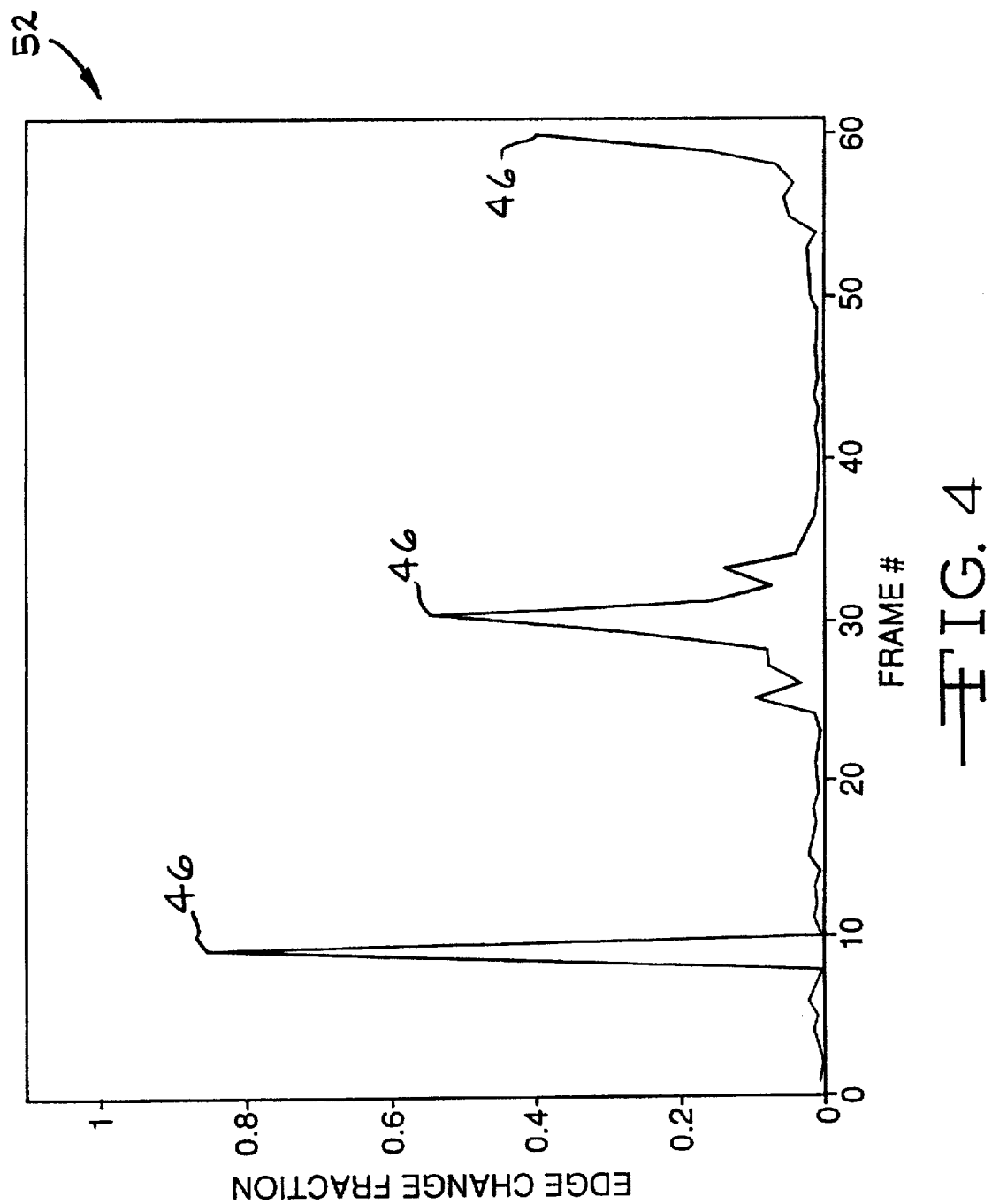
FIG. 4 is a graph of a sequence (with no subsampling) of video frames and illustrating peaks in the edge change fractions between successive ones thereof.
Figure 9:
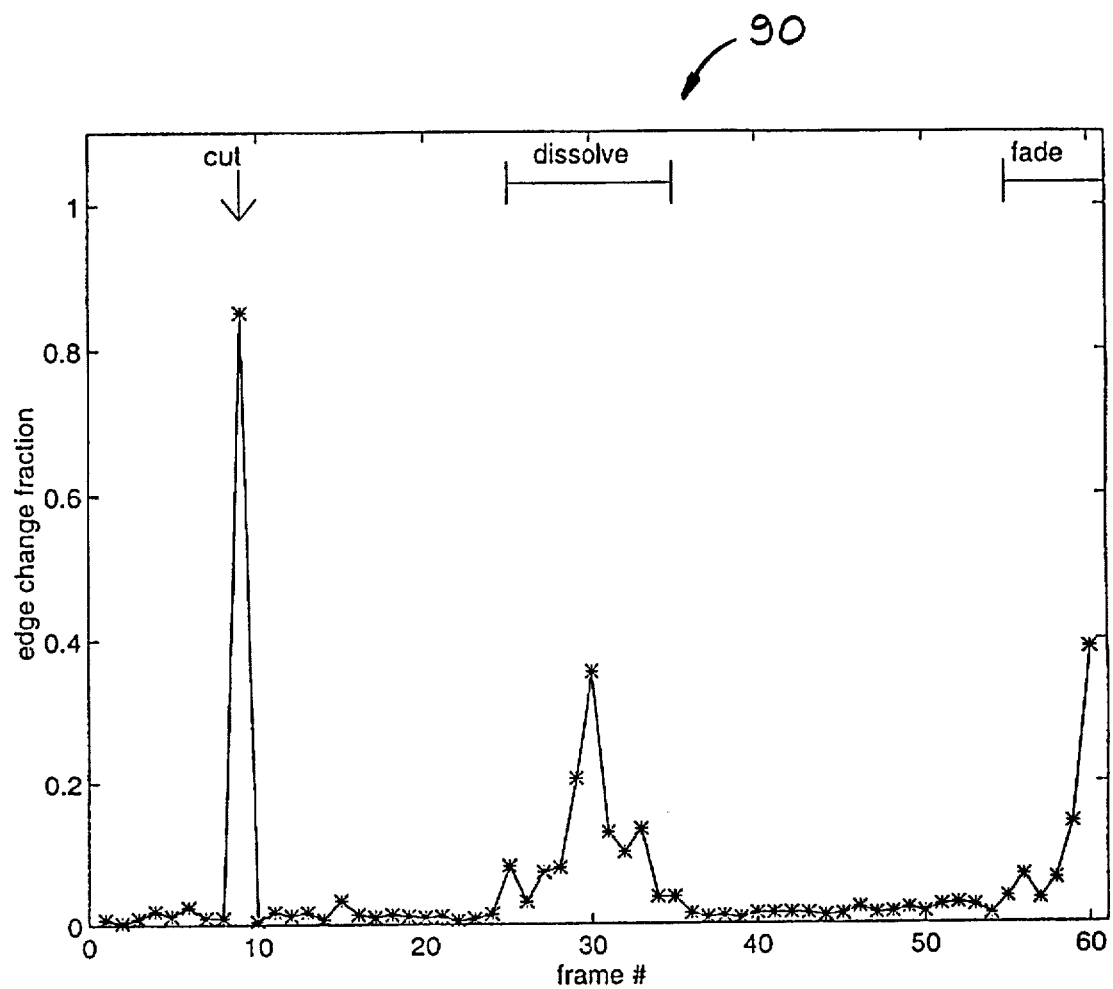
Figure 10:
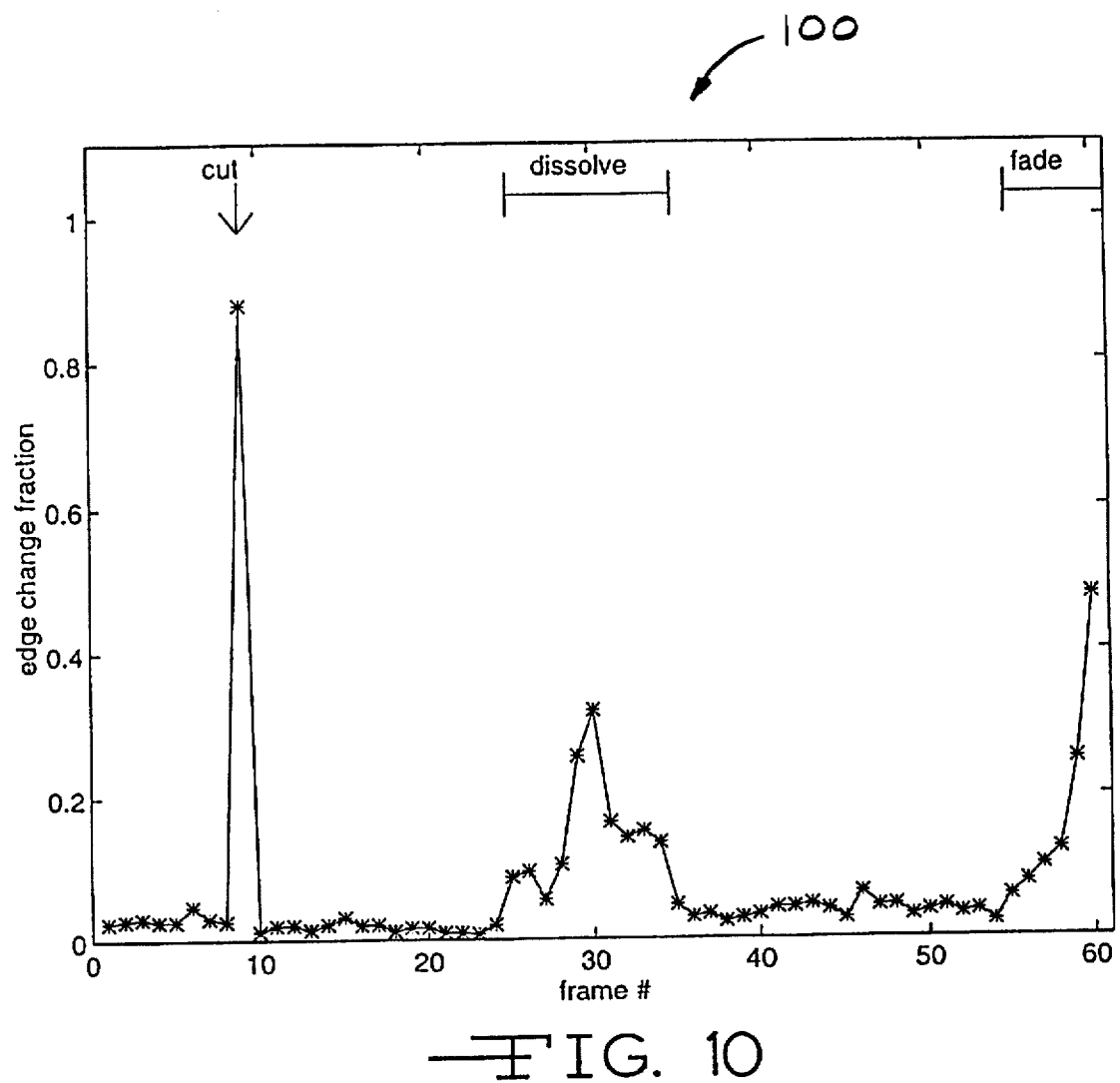
Figure 11:
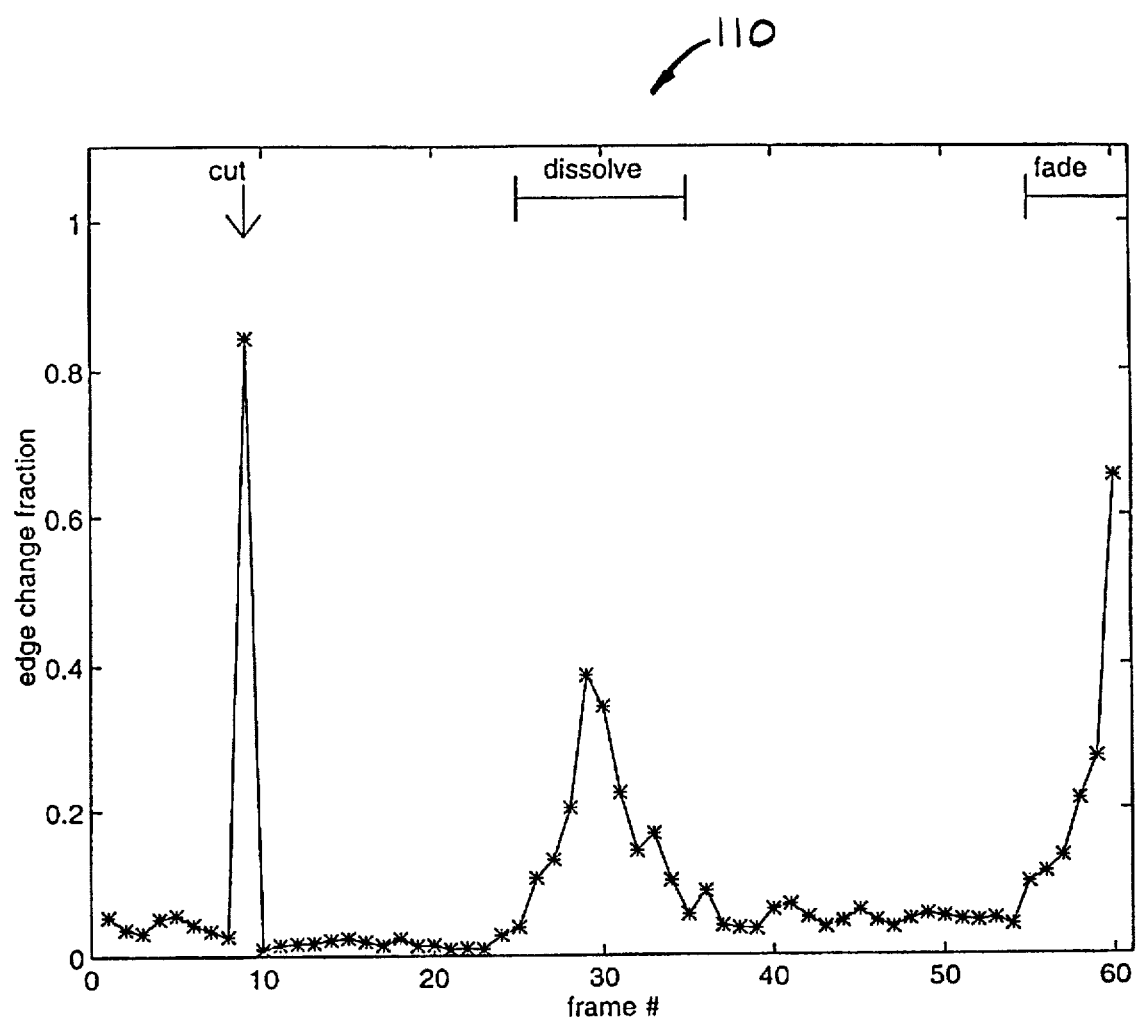

FIGS. 9, 10, and 11 are graphs of edge change fraction results for the sequence of FIG. 4 at 0.48, 0.22, and 0.18 bits per pixel JPEG compression, respectively.

Figure 12:
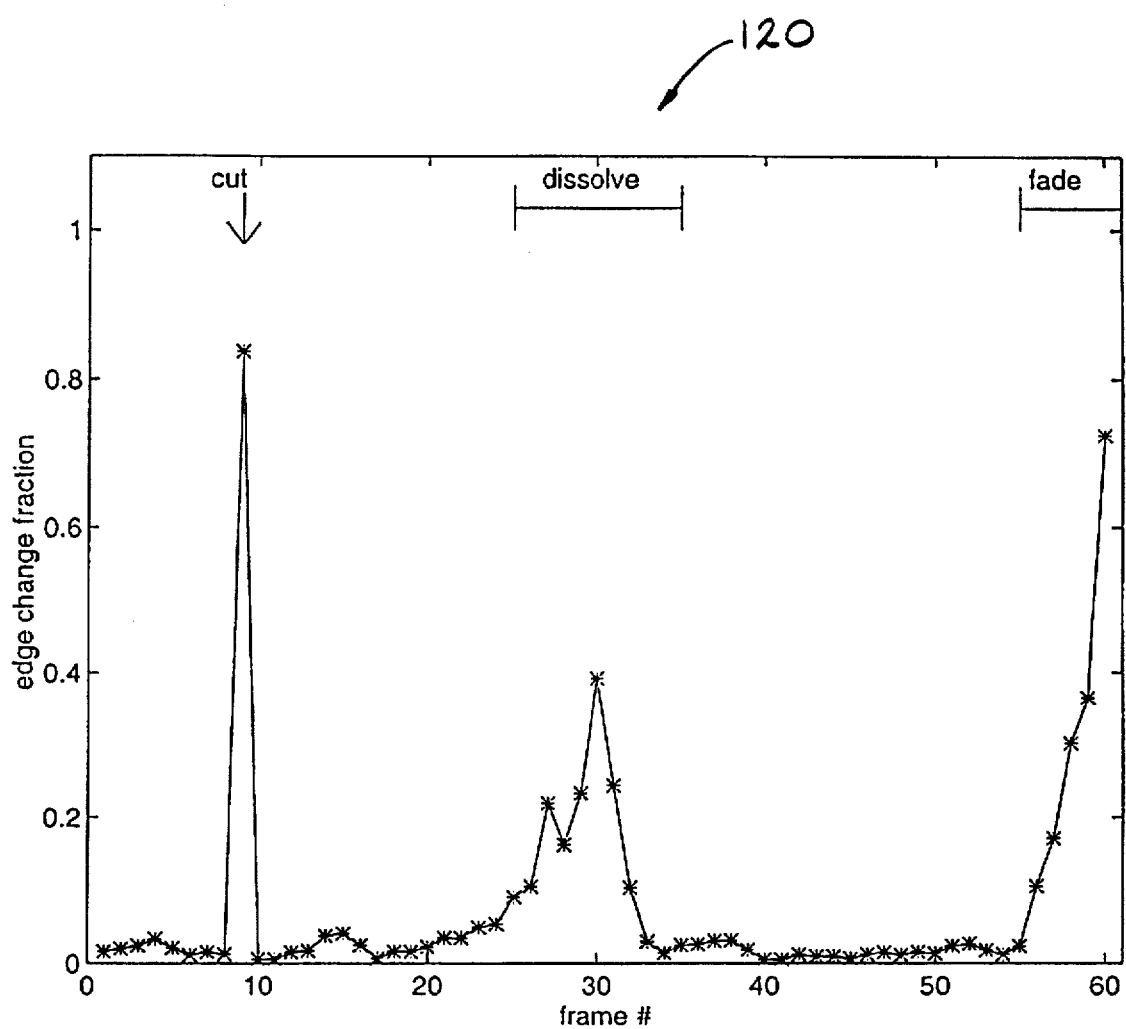
Figure 13:
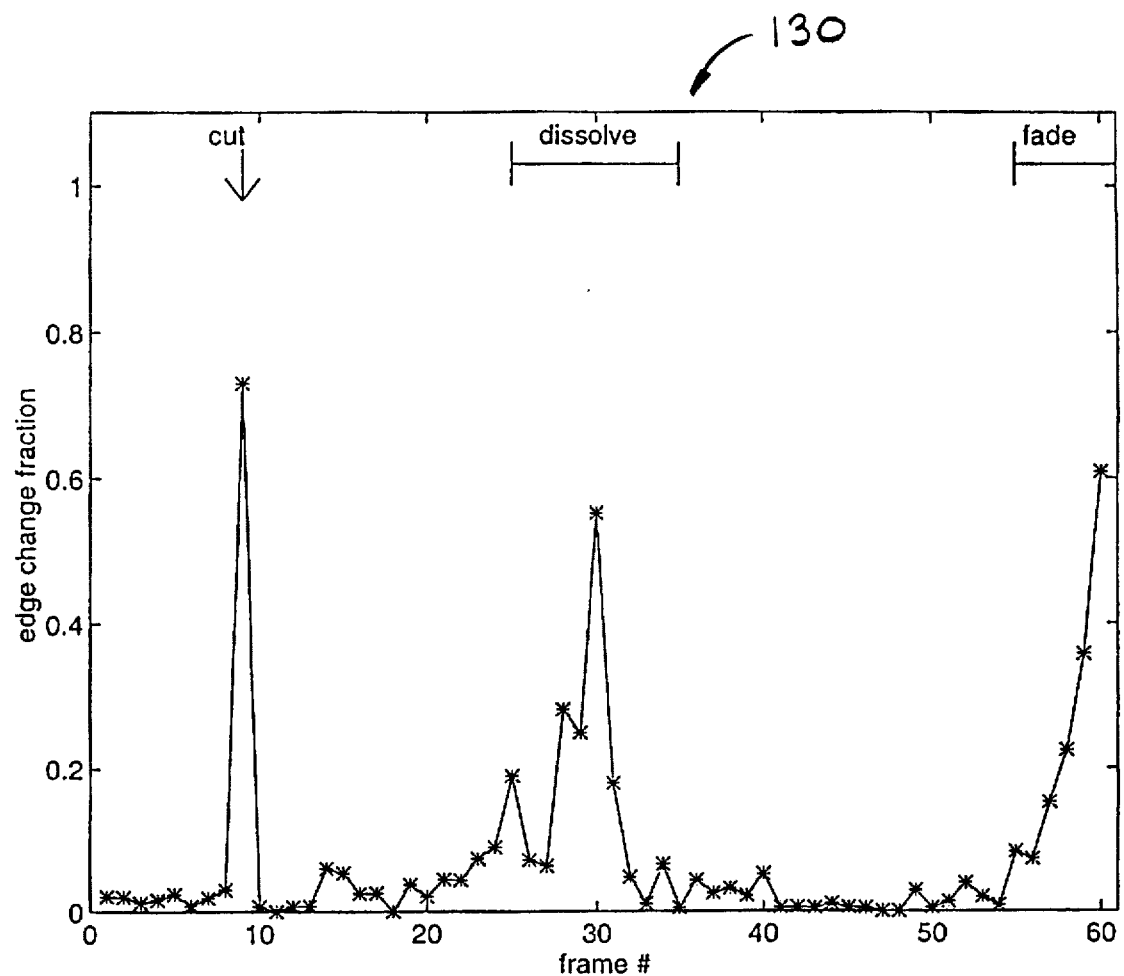

FIGS. 12 and 13 are graphs of edge change fraction results for the sequence of FIG. 4 with 2:1 horizontal and vertical subsampling, and 4:1 horizontal and vertical subsampling, respectively.

Figure 14:
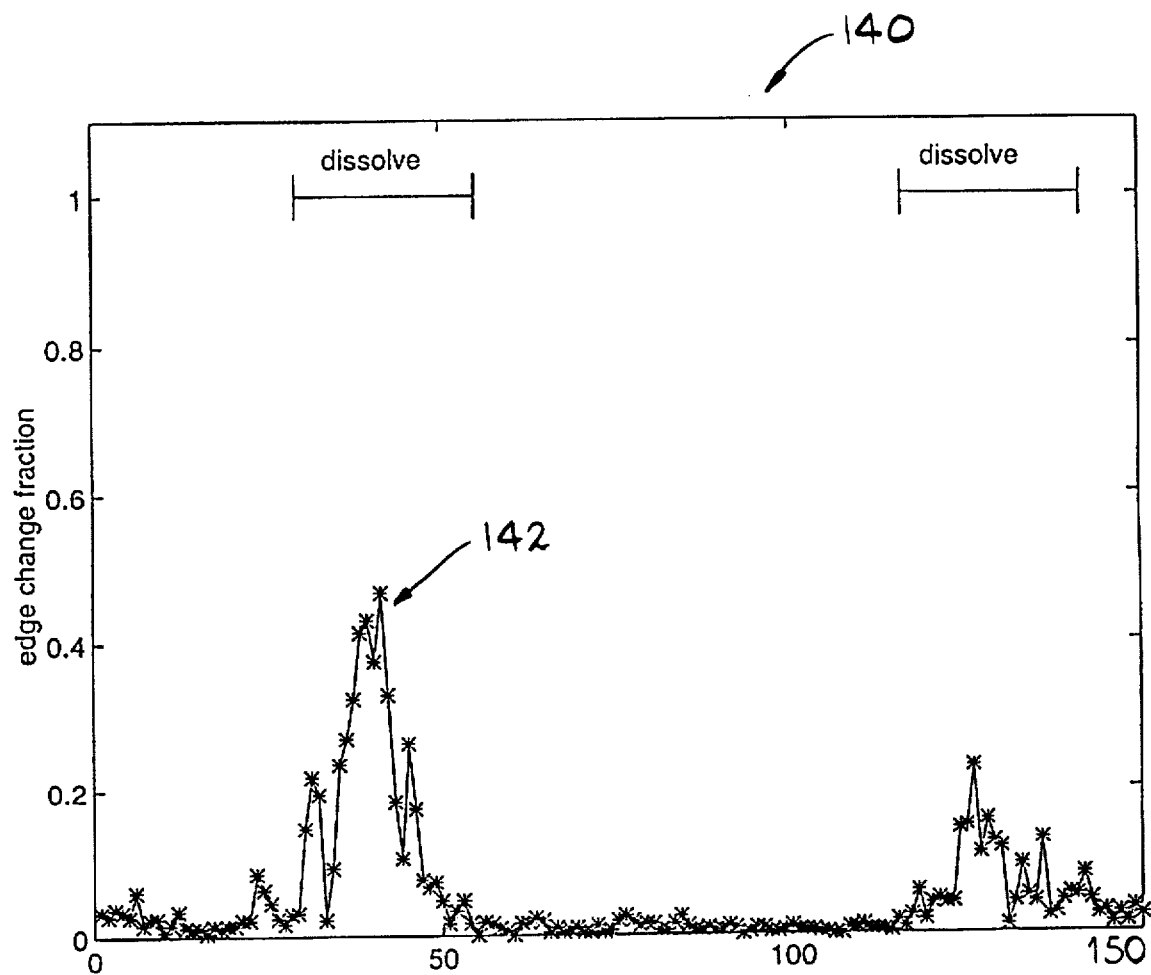
Figure 15:
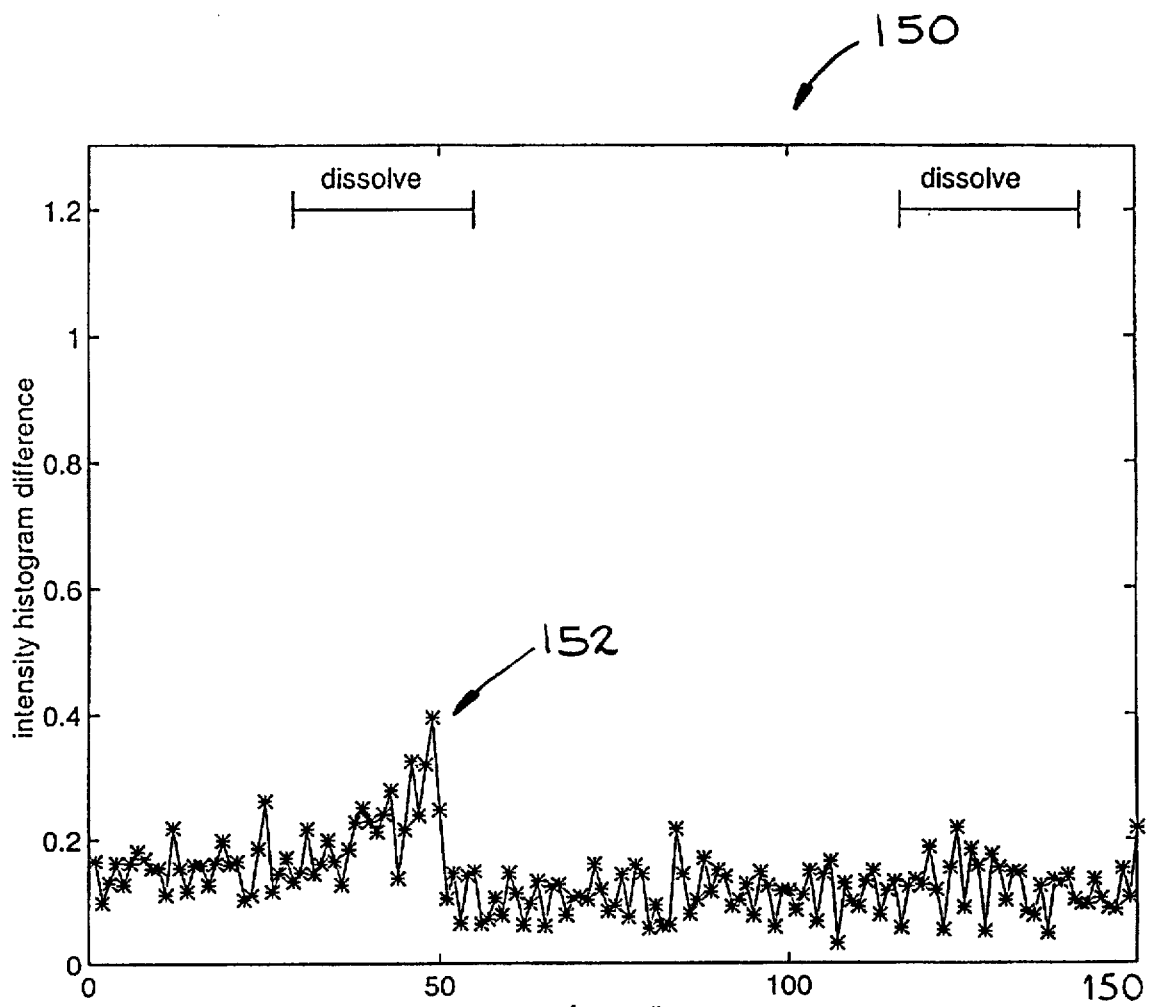
Figure 16:
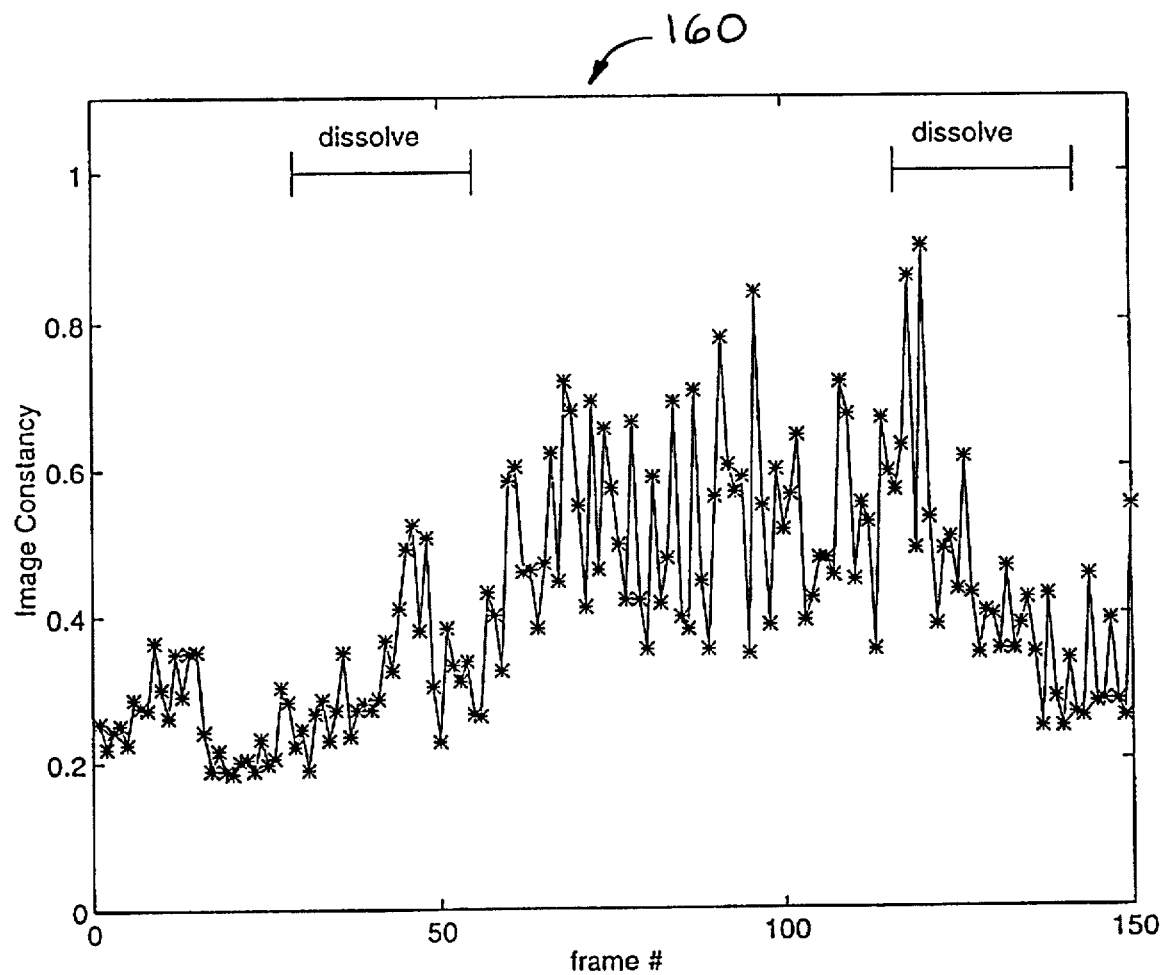

FIGS. 14, 15, and 16 are graphs comparing edge change fraction results for the process of the present invention, the intensity histogram difference process, and the chromatic scaling process, respectively.

Figure 17:
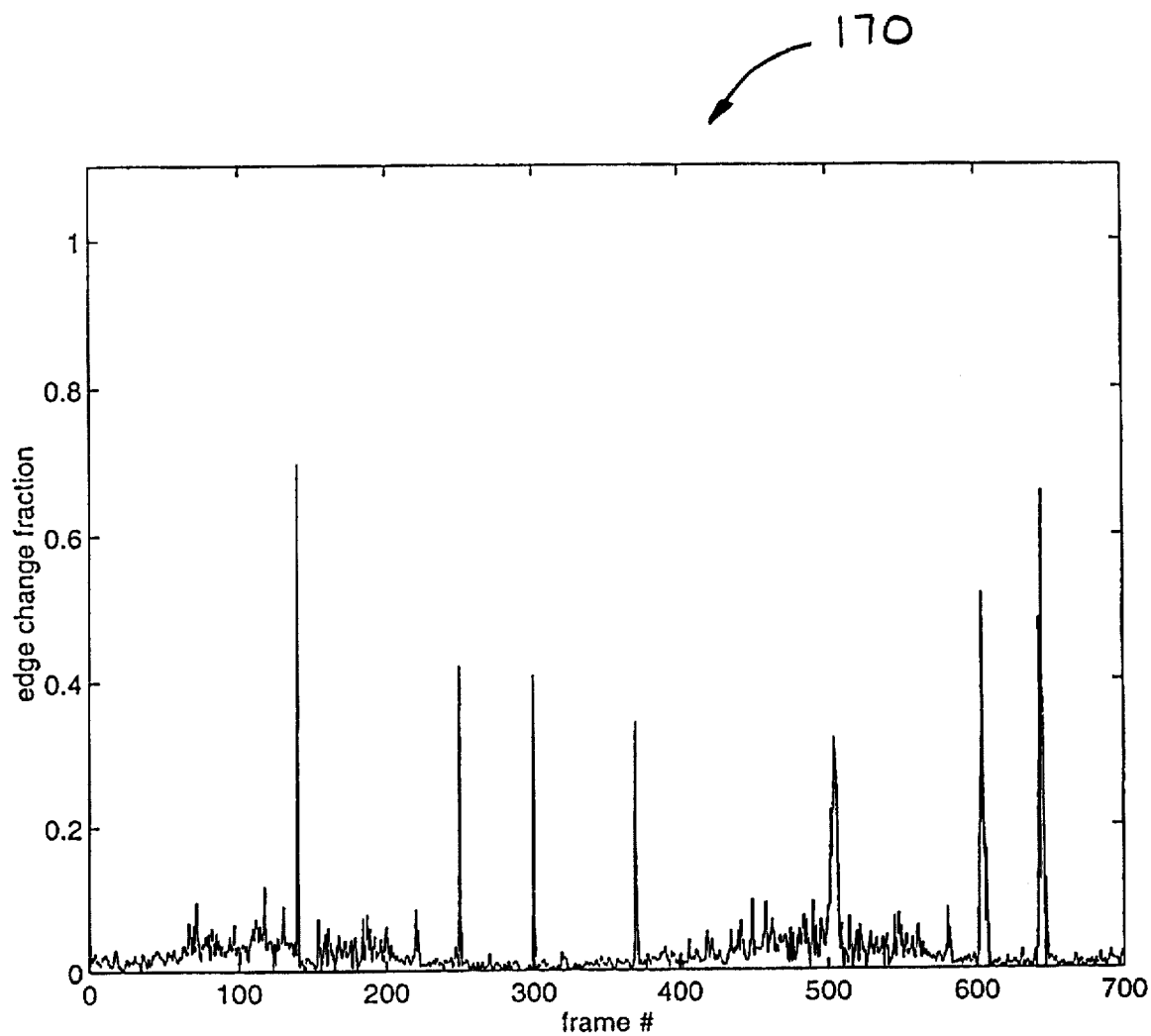
Figure 18:
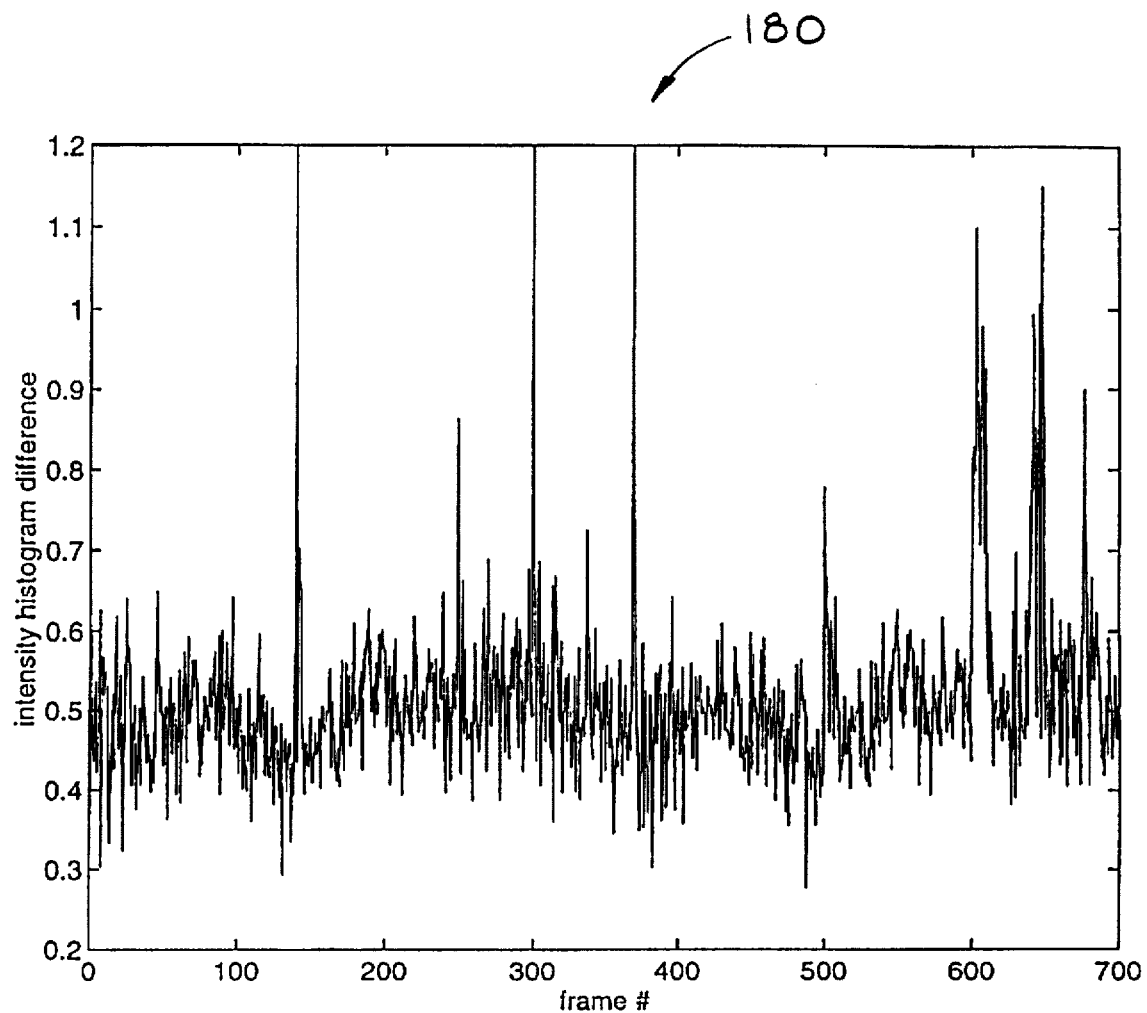

FIGS. 17 and 18 are graphs comparing edge change fraction results for a different sequence for the process of the present invention and the intensity histogram difference process, respectively.

Figure 19:
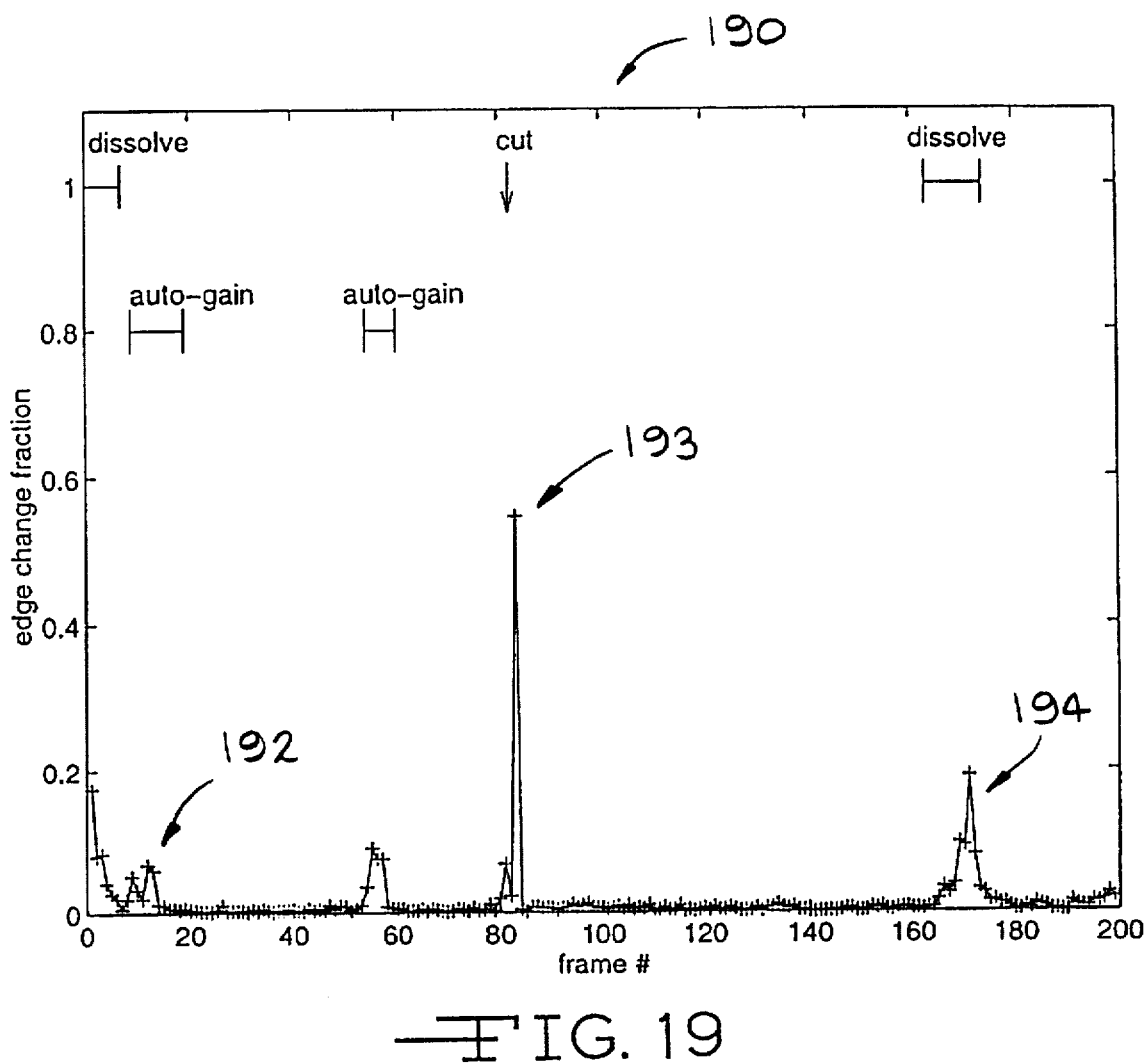
Figure 20:
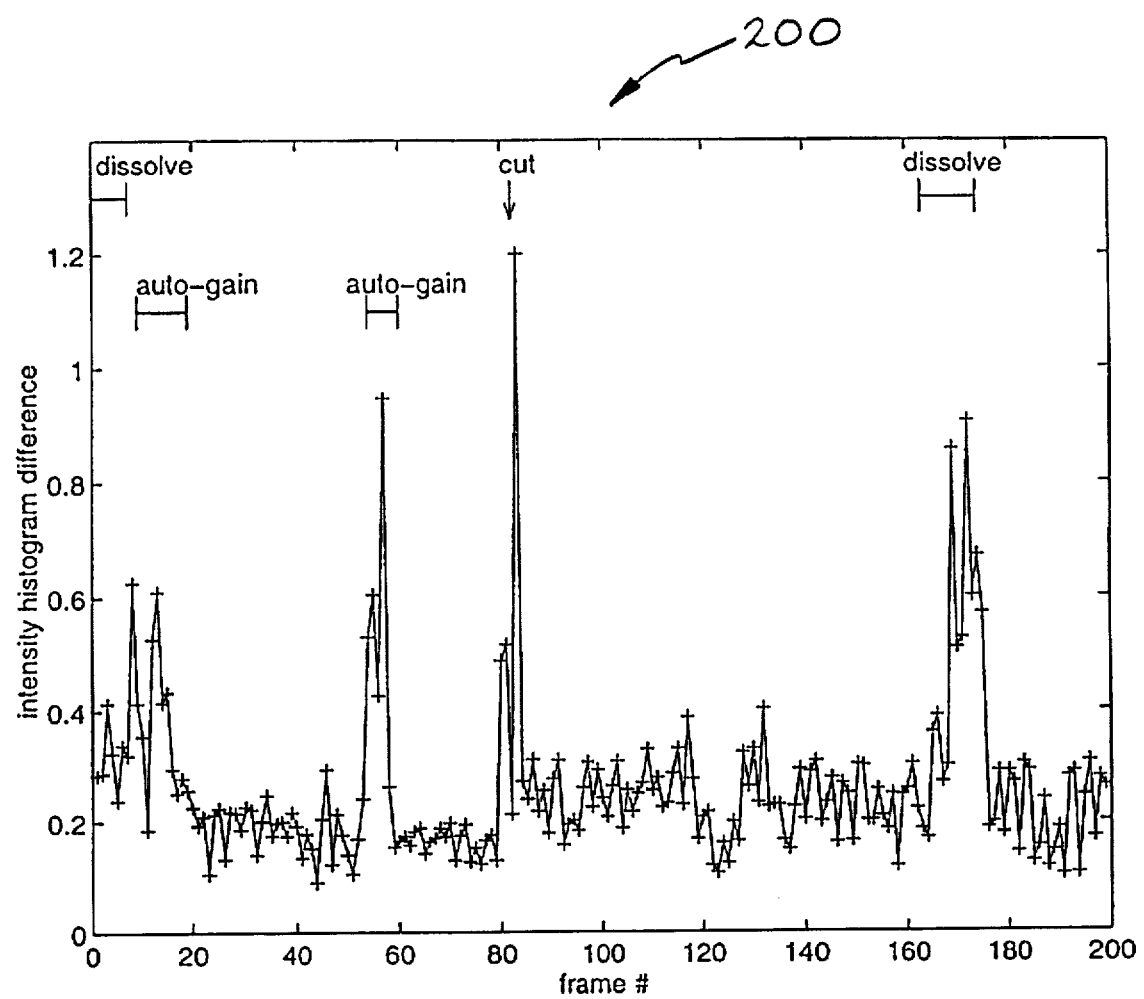

FIGS. 19 and 20 are graphs comparing edge change fraction results for yet another sequence for the process of the present invention and the intensity histogram difference process, respectively.

Figures 21, 22:
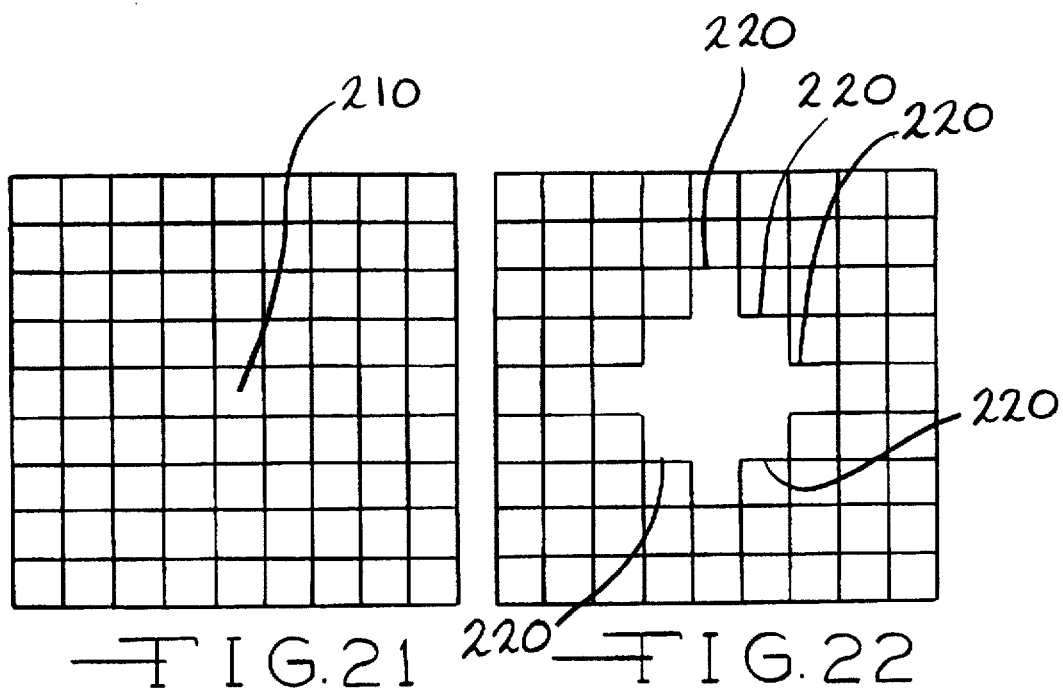

FIGS. 21 and 22 are schematic illustrations of a frame having an un-dilated edge pixel and corresponding dilated pixels (for a radius of 2 pixels), respectively.

Figure 23A:
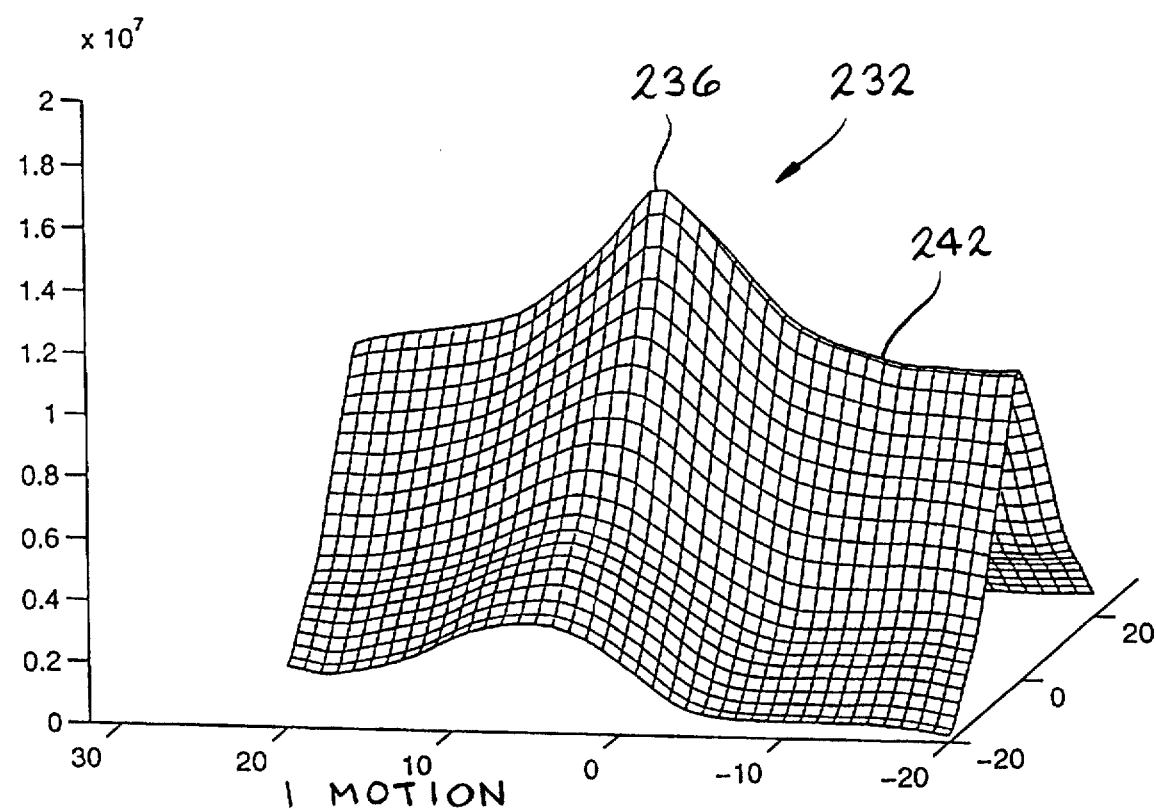
Figure 23B:
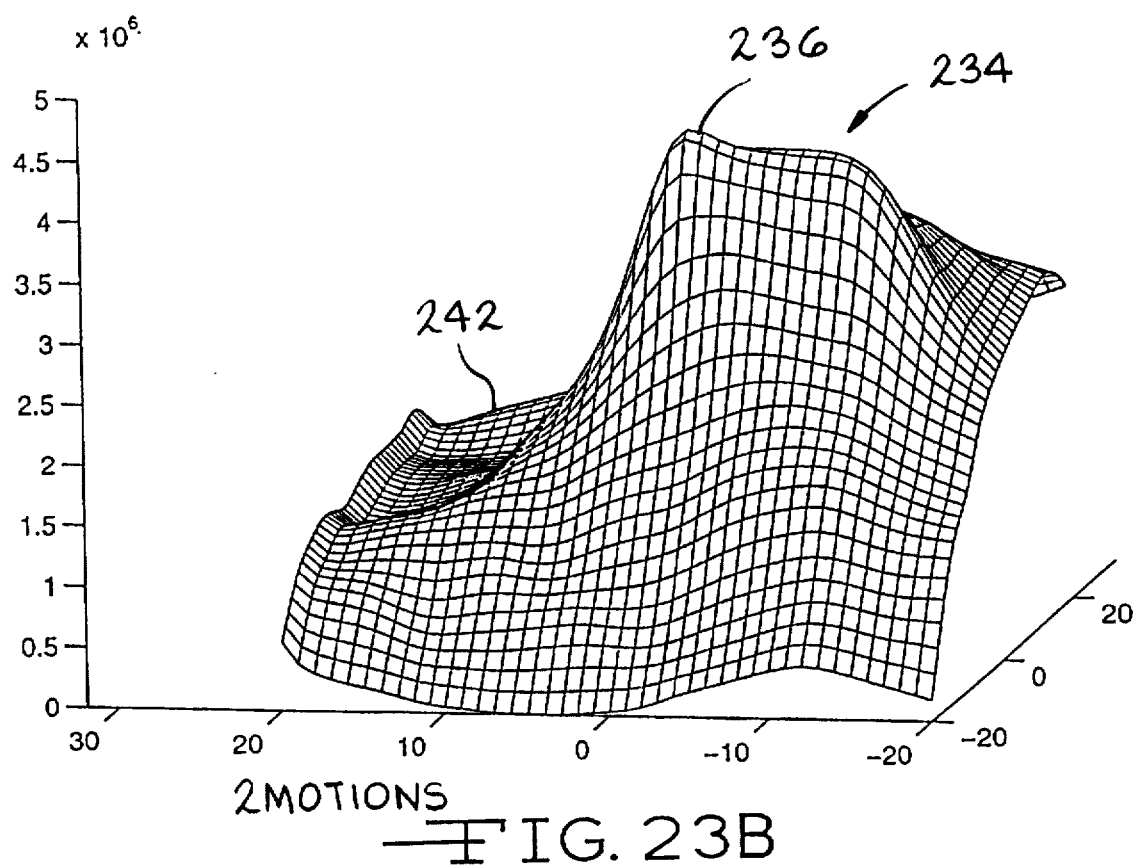
Figure 24A:
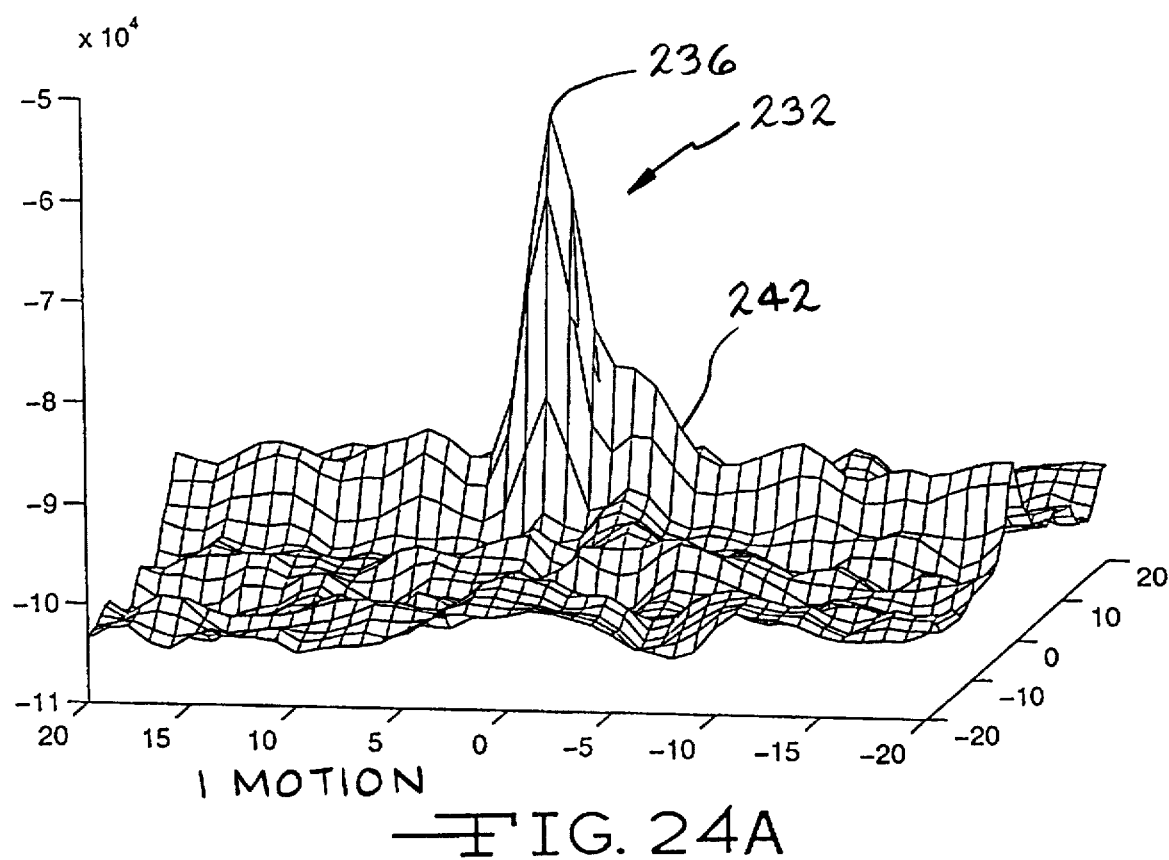
Figure 24B:
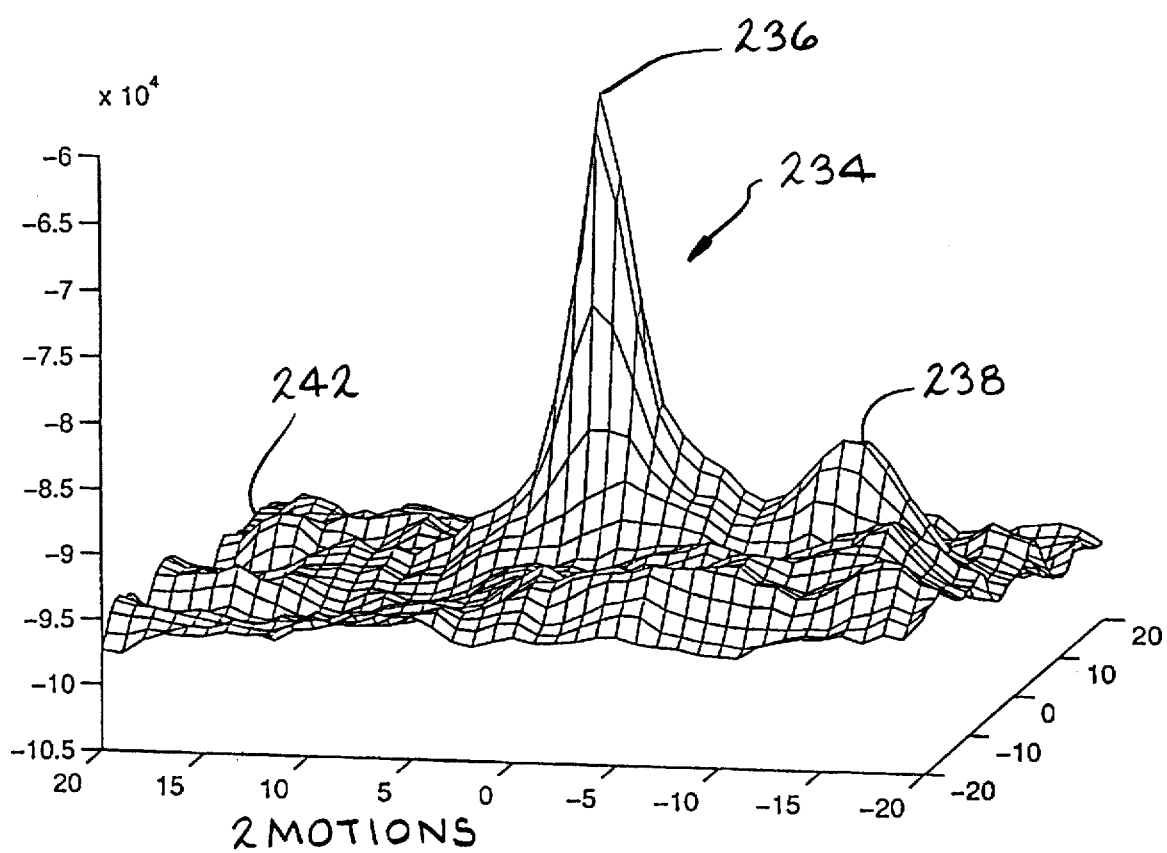

FIGS. 23A, 23B, 24A and 24B are error surfaces for $L_2$ correlation and census transform correlation motion algorithms, respectively, for scenes with one motion FIGS. 23A and 24A, and two motions FIGS. 23B and 24B.

Figure 25:
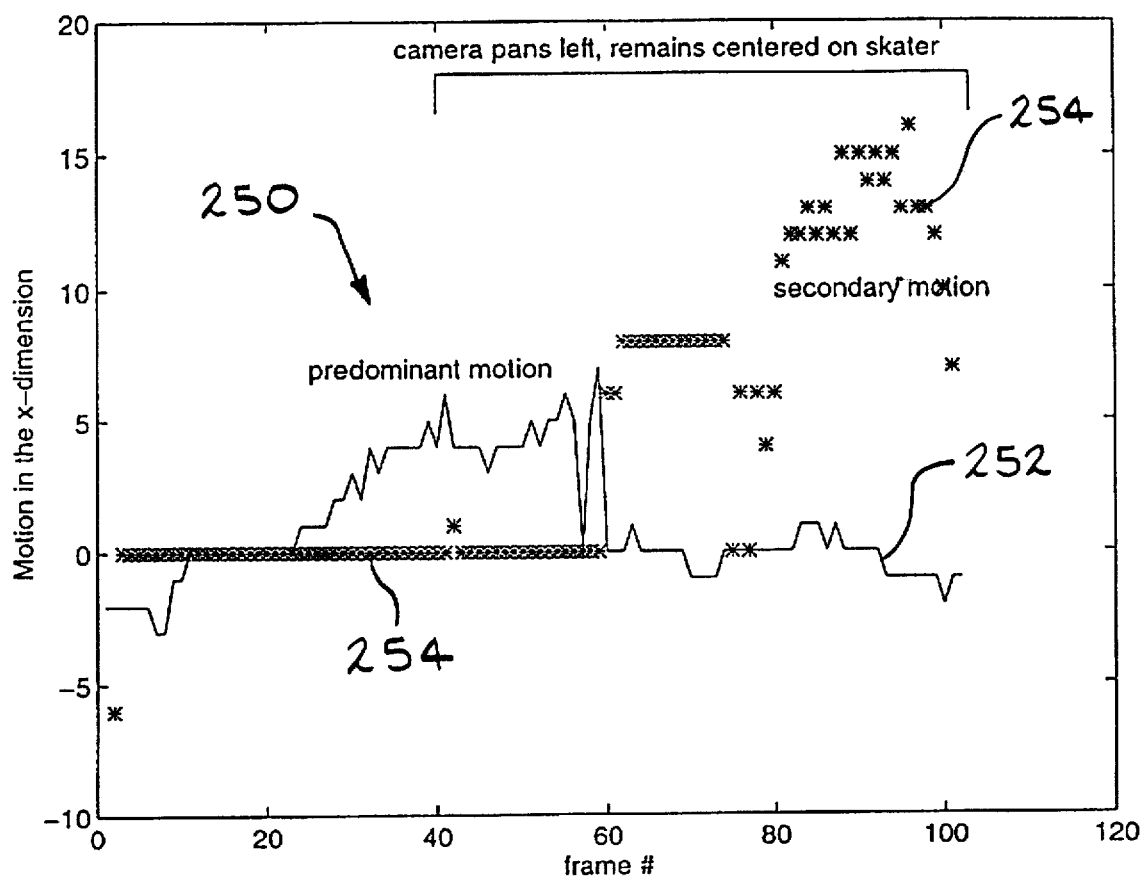

FIG. 25 is a graph illustrating primary and secondary motions in an ice skater sequence.

Figure 26:
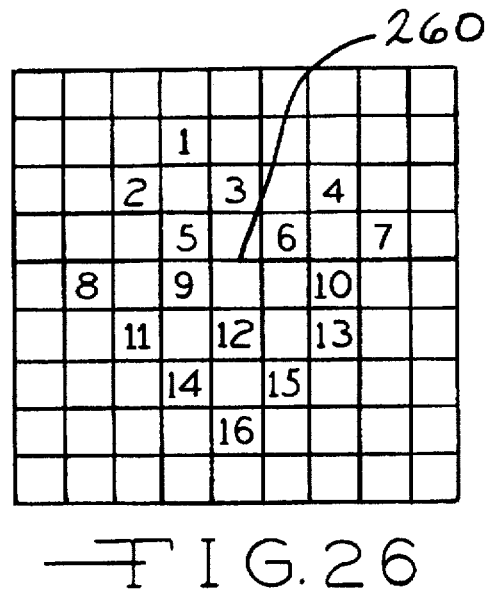

FIG. 26 is a schematic illustration of a frame illustrating a pixel and a census neighborhood of 16 neighboring pixels.

Figure 27:
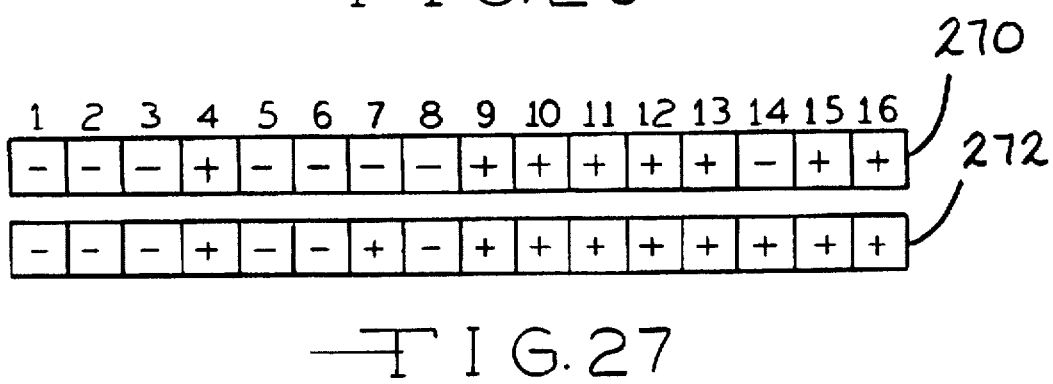

FIG. 27 is an illustration of a comparison of census-transformed points for the frame of FIG. 26 by counting the number of similarities.

DETAILED DESCRIPTION OF THE PREFERRED EMBODIMENT

Figure 1:
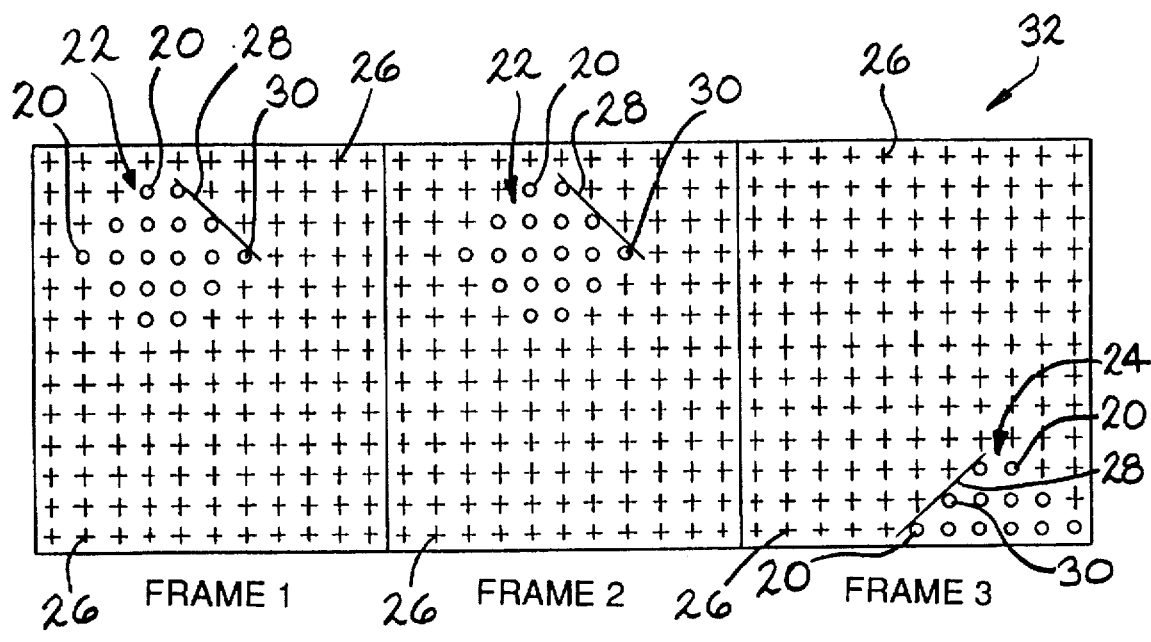
FIG. 1 is a schematic view of a sequence of three successive video frames illustrating a scene break between frames 2 and 3.

Referring to FIG. 1, there is illustrated at 32 a portion of video tape containing a plurality of three successive video frames 1, 2, and 3 for providing a moving or motion picture. The o's, illustrated at 20, represent pixels providing one intensity of lighting so that one can see in frames 1 and 2 an object, illustrated at 22, and in frame 3 a different object, illustrated at 24. The +'s, illustrated at 26, represent pixels providing a different intensity of lighting, perhaps background. It can be seen that the object 22 has moved in frame 2 a distance of one pixel to the right from its position in frame 1. This would not indicate a scene break. However, the object 22 is not present in frame 3, and the different object 24 is present therein at a different location. This would indicate a scene break.

The boundaries between adjacent groups of pixels of different intensities, i.e., between pixels 20 and pixels 26, are defined herein and in the claims as "intensity edges", illustrated at 28. It is seen that the intensity edges in frame 2 are close to intensity edges in frame 1 while the intensity edges in frame 3 are far from intensity edges in frame 2. It can thus be seen that, during a cut or a dissolve, new intensity edges (those first appearing in the later of two frames) often appear far from the locations of old intensity edges (those in the earlier of the two frames), and old intensity edges often disappear far from the locations of new intensity edges. In order to utilize this observation, the intensity edges must be broken down, i.e., they may be viewed as broken down into edge pixels, i.e., those pixels, illustrated at 30, located at an intensity edge 28. However, in practice, it is the intensity differences between adjacent pixels which are used to determine intensity edges, as discussed hereinafter, and lines 28 may be said to connect the locations (between adjacent pixels) where the intensity differences are greater than a threshold value. An edge pixel that appears (in a later frame) far from an existing edge pixel (in the earlier frame) is defined herein and in the claims as an "entering edge pixel", and an edge pixel that disappears (in a later frame) far from an existing edge pixel (in the later frame) is defined herein and in the claims as an "exiting edge pixel." Thus, with respect to frame 3, the intensity edge pixels 30 in frame 2 are exiting edge pixels since they disappear in frame 3. With respect to frame 1, the intensity edge pixels in frame 2 are entering edge pixels.

In accordance with the present invention, the entering and exiting edge pixels in each of generally successive frames are counted to detect scene breaks and to classify them as cuts, fades, or dissolves. By analyzing the spatial distribution of entering and exiting edge pixels, wipes may also be detected and classified.

Figure 3:
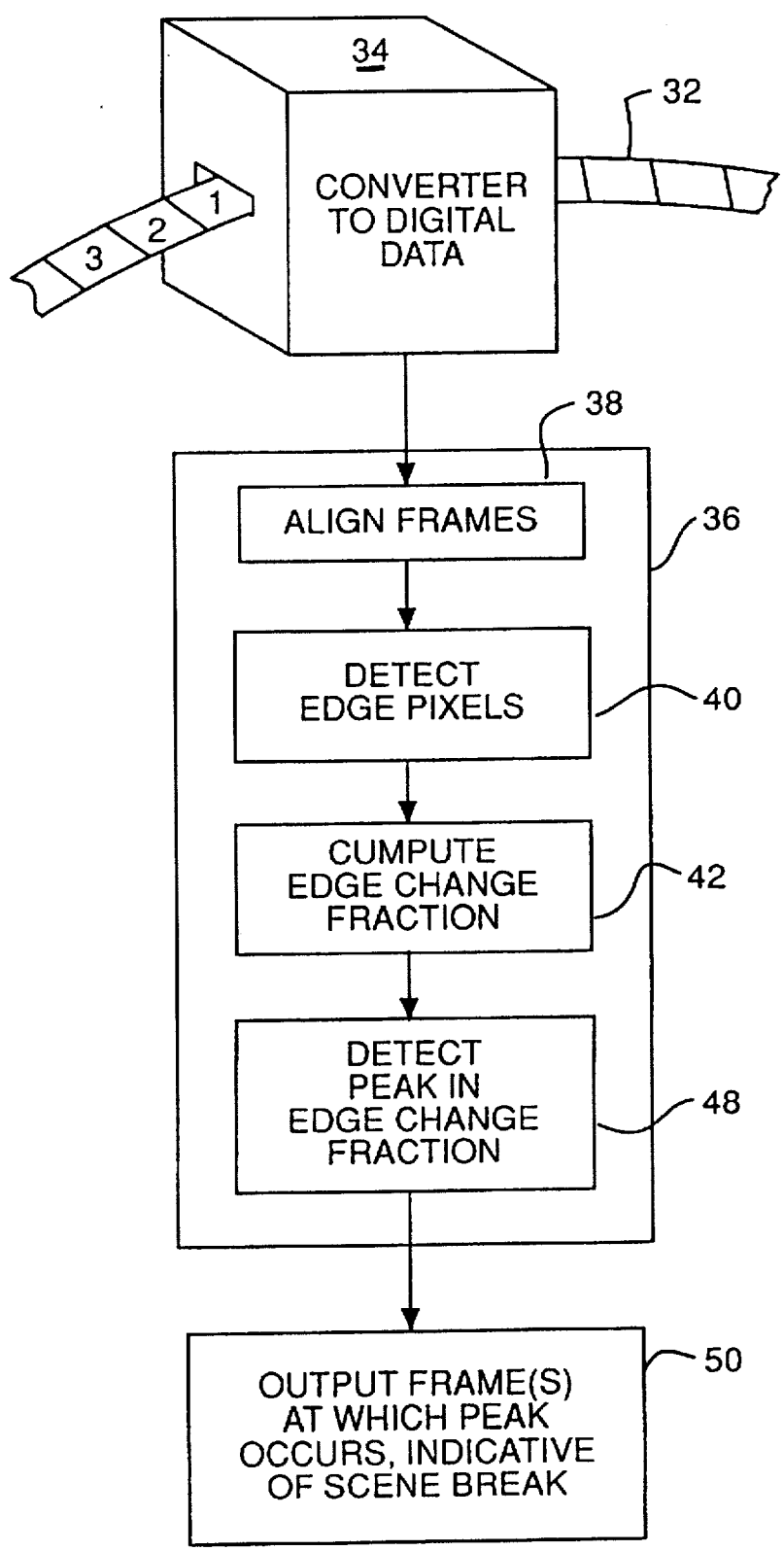
FIG. 3 is a block diagram of a process which embodies the present invention.

Referring to FIG. 3, the images on video tape 32 containing the frames 1, 2, 3, etc. are converted to digital data of an array of pixels in a suitable conventional converter, illustrated at 34, in accordance with principles commonly known to those of ordinary skill in the art to which this invention pertains. For example, converter 34 may be a quantizer and having a frame buffer, as described in the aforementioned U.S. Pat. No. 5,099,322 to Gove, which is incorporated herein by reference. The digital data is then sent to a suitable computer, illustrated at 36, which is suitably programmed, in accordance with principles commonly known to those of ordinary skill in the art to which this invention pertains, to process the digitized pixel data as described hereinafter and as illustrated in FIG. 3.

In order to neutralize the effects of global motion, a suitable registration technique is used to compute the global motion between frames. This computed global motion is then suitably applied to the digital data to digitally align the frames, as illustrated at 38, before detecting entering and exiting edge pixels, as illustrated at 40. Examples of suitable registration techniques are found in "A Survey of Image Registration Techniques", *ACM Computing Surveys*, 24(4), December 1992, by Lisa Brown, which is incorporated herein by reference.

From the count of entering and exiting edge pixels, an edge change fraction is computed, as illustrated at 42. This is computed for a frame from the digital data of that frame and a preceding frame. The edge detection step 40 results in two binary images E and $E^1$, such as for frames 1 and 2 or for frames 2 and 3. The "edge change fraction" is defined, for the purposes of this specification and the claims, as the maximum of (1) the fraction of intensity edge pixels in a given frame which are each more than a predetermined distance from the respectively closest intensity edge pixel in a previous frame in a sequence or (2) the fraction of intensity edge pixels in the given frame which are each more than the predetermined distance away from the respectively closest intensity edge pixel in the next successive frame in the sequence. Unless otherwise indicated, an "edge pixel" is meant to refer herein to an intensity edge pixel. Thus, let $P_{in}$ denote the fraction of edge pixels in $E^1$ which are each more than distance r from the closest edge pixel in E. A suitable distance r may be related to the size of the video frames. For example, for a frame having 160×120 pixels, the distance r may suitably be, for example, 4 to 6 pixels. $P_{in}$ measures the proportion of entering edge pixels. It should assume a high value during a fade in, or a cut, or at the end of a dissolve. Due to the quantization of intensities, new intensity edges will generally not show up until the end of the dissolve. Similarly, let $P_{out}$ be the fraction of edge pixels in E which are each more than distance r away from the closest edge pixel in $E^1$. $P_{out}$ measures the proportion of exiting edge pixels. It should assume a high value during a fade out, or a cut, or at the beginning of a dissolve. The basic measure of dissimilarity is:

$$p = \max(P_{in}, P_{out}).$$

This represents the fraction of changed edge pixels, i.e., this fraction of the edge pixels have entered or exited.

Figure 2:
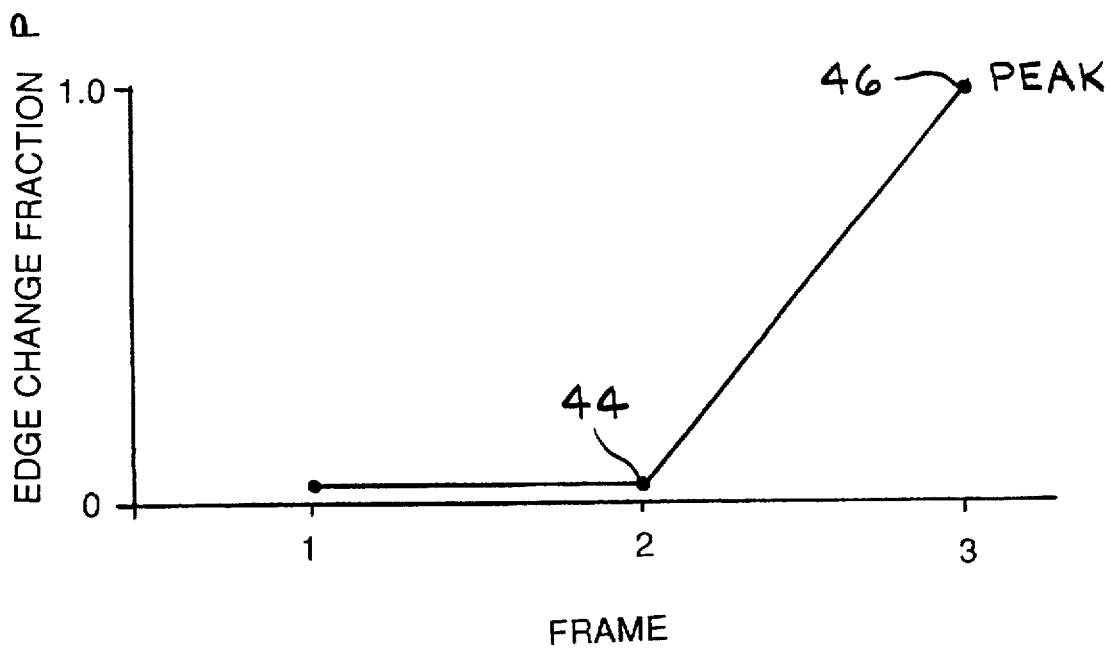
FIG. 2 is a graph illustrating the edge change fraction for each of the frames of FIG. 1.

When two successive frames are of the same scene, the edge change fraction should change relatively little, i.e., it may be close to zero, as illustrated at 44 for frame 2 in FIG. 2. However, during a scene change, the edge change fraction in a succeeding frame may be very high, i.e., 1.0, as illustrated at 46 for frame 3 in FIG. 2, or approaching 1.0.

In accordance with the present invention, scene breaks are detected by looking for peaks, illustrated at 46 in FIG. 2, in the edge change fraction P, as illustrated at 48 in FIG. 3. The computer 36 is programmed to output the identity of a frame or frames at which the peak 46 occurs thereby indicating to the user the locations of scene breaks, as illustrated at 50 in FIG. 3.

The edge detection 40 may be suitably based on Canny's algorithm, which is described in "A Computational Approach to Edge Detection", *IEEE Transactions on Pattern Analysis and Machine Intelligence*, 8(6):679–698, 1986, by John Canny, which is incorporated herein by reference, or by any other suitable means, using principles commonly known to those of ordinary skill in the art to which this invention pertains. A suitable method of detecting points of intensity edges comprises calculating the squared intensity gradient magnitudes between pixels and vertically and horizontally adjacent pixels, and selecting as intensity edge points those wherein the square root of the squared intensity gradient magnitudes are more than a threshold value τ, a threshold value of 22 for an 8-bit grayscale image being considered suitable. For example, if $(I(x,y)-I(x+1,y))^2 + (I(x,y)-I(x,y+1))^2 \geq \tau^2$, then the edge image pixel E(x,y) is marked as an edge pixel, otherwise it is not marked.

To increase the robustness of the edge detector, the image may be smoothed using a Gaussian average to reduce noise, and Canny-style non-maximum suppression performed to post-process the edge image, these methods being commonly known to those of ordinary skill in the art to which this invention pertains. For additional efficiency, smoothing may be performed using a small number of box filters, as described in "Efficient Synthesis of Gaussian Filters by Cascaded Uniform Filters", *IEEE Transactions on Pattern Analysis and Machine Intelligence*, 8(2):234–239, March 1986, by William M. Wells, III, which is incorporated herein by reference.

FIG. 4 illustrates at 52 a more comprehensive example of the detection of scene breaks. It should be noted that most of the scenes have an edge change fraction which is near zero, indicative of a continuation of the same scene. Peaks should be noted at frames 9, 30, and 60, indicative of scene breaks, these peaks 46 ranging from about 0.4 to over 0.8, well above zero edge change fraction. The peak at frame 9 indicates a cut since the adjacent frames 8 and 10 have edge change fractions near zero. The peaks at frames 30 and 60 indicate a dissolve and a fade respectively, for reasons which will be discussed hereinafter, since adjacent frames have edge change fractions substantially greater than zero, i.e., up to almost 0.3.

As previously discussed, computed global motion between frames may be used to align the frames, as illustrated at 38, before detecting entering or exiting edge pixels. For example, assume that the camera is moving to the left, and so image I' is shifted to the right with respect to Image I, similarly as shown for the object 22 in frames 1 and 2 of FIG. 1. It should of course be noted that the difference between frames 1 and 2 in FIG. 1 may be due either to camera panning or to motion of object 22. Even if the difference is due to object motion, the application of the registration algorithm would not affect the results since the edge pixels in frame 2 would be within distance τ of the edge pixels in Frame 1. A registration algorithm may be used which will compute the translation that best aligns I with I' (which in this example is a shift to the right). We can apply this translation to I before computing the edge change fraction.

There are a wide variety of registration algorithms reported in the literature. Ones which may be used involve global similarity measures between images and are based on correlation. Begin with some function f for comparing two images on a pixel-by-pixel basis. Then, search for the integer values of δx and δy that maximize the quantity $$\sum_{x,y} f(I[x+\delta x, y+\delta y], I'[x,y])$$

where the sum is taken over all pixels. Maximize over some range of possible motions $$\|\delta x\| + \|\delta y\| \leq \Delta.$$

Note that this search is only for a translational motion between the two images. While it is possible to handle affine or projective motions, they incur significant additional overhead and do not necessarily result in better performance. Then, warp I by the overall motion before computing $P_{in}$ and $P_{out}$.

The registration algorithm which is used is desirably efficient, can withstand compression artifacts, and is robust in the presence of multiple motions. This last property is particularly desirable since an image may have multiple motions, and the registration algorithm must then compute the predominant motion. Examples of suitable registration or motion compensation algorithms are discussed hereinafter.

Exploitation of the motion vectors contained in MPEG-compressed video in order to determine object or camera motion has been suggested, as discussed in the Zhang et al paper. However, MPEG encoders optimize for compression and do not necessarily produce accurate motion vectors. Furthermore, MPEG-compressed streams do not contain motion vectors for all images. A preferred motion compensation or registration approach is census transform correlation, a non-parametric approach described in "Non-parametric Local Transforms for Computing Visual Correspondence", in Jan-Olof Eklundh, editor, *3rd European Conference on Computer Vision*, number 801 in LNCS, pages 151–158, Springer-Verlag, 1994, by Ramin Zabih and John Woodfill. This algorithm operates by transforming the image in an outlier-tolerant manner and then using correlation. Another preferred approach is the Hausdorff distance, an outlier-tolerant method that operates on edge-detected images. This method is described in "Comparing Images Using the Hausdorff Distance", *IEEE Transactions on Pattern Analysis and Machine Intelligence*, 15(9):850–863, 1993, by Daniel Huttenlocher, Greg Klanderman, and William Rucklidge, which is incorporated herein by reference.

In order to compute the values of the edge change fraction P for a sequence of images, let $\delta x$ and $\delta y$ be the translations necessary to align the images I and I', as calculated by one of the previously discussed global motion compensation methods.

Figure 5:
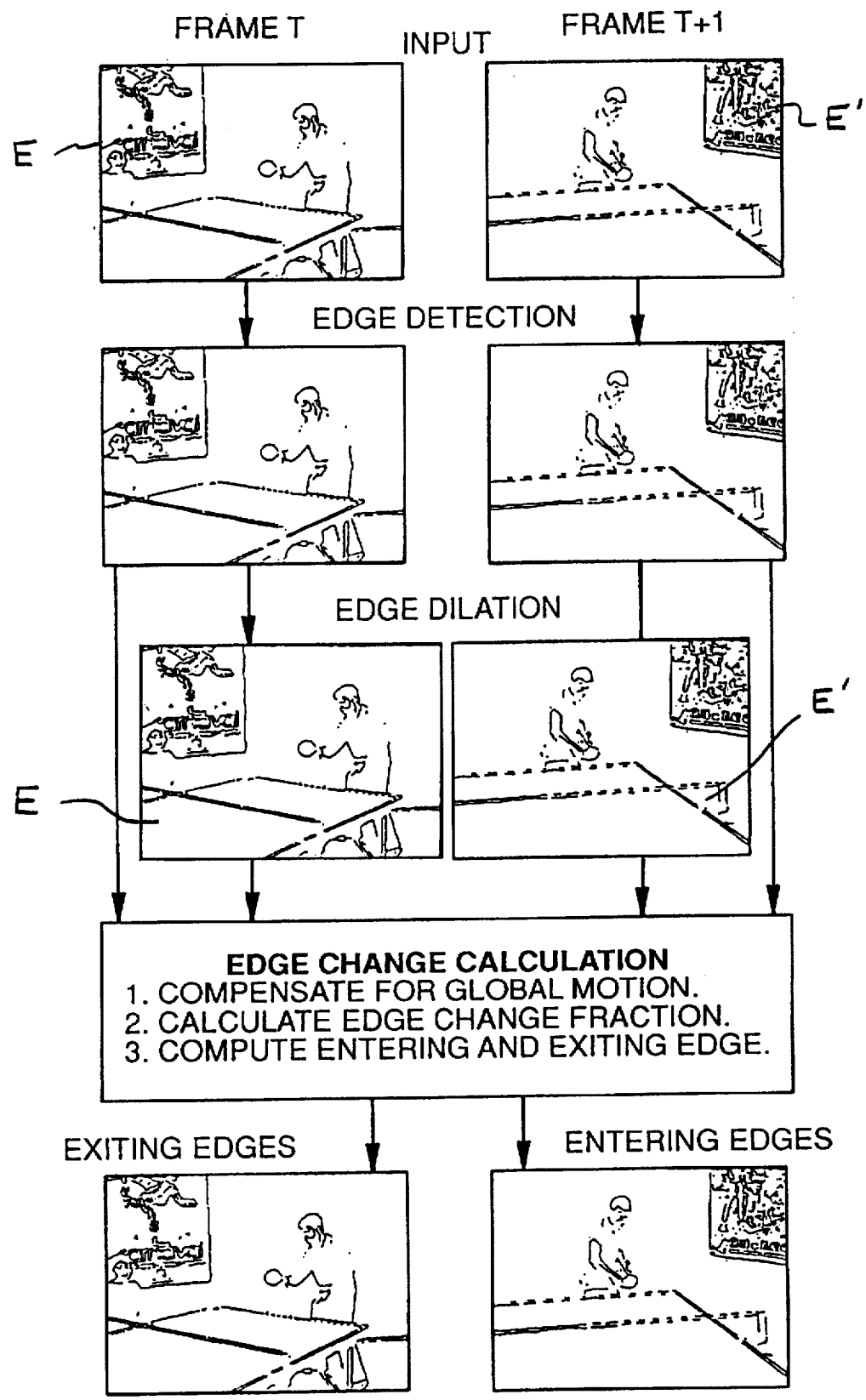
FIG. 5 is a diagram illustrating the steps in the derivation of the edge change fractions for successive frames.

The computation of the edge change fraction is shown in FIG. 5, which shows a cut between two frames t and t+1. While P is being calculated, the locations of the exiting and entering pixels can be saved and their spatial distribution analyzed when looking for wipes and other spatial edits.

As illustrated in FIG. 5, copies of images E and E' are created with each edge pixel dilated by the radius r to cover an area which encompasses adjacent pixels. These dilated images are called herein $\overline{E}$ and $\overline{E}'$. Image dilation is a software tool for determining, after registration of frames for compensation of sweeping motion, whether an intensity edge in image E' is within distance r of an intensity edge in image E. Alternatively, the distances may be calculated and compared to distance r. Image dilation flags distance below the threshold distance r between edge pixels in successive frames which is representative of normal motion between objects in a scene. Thus, image $\overline{E}$ is a copy of E in which each edge pixel of E, illustrated at 210 in FIG. 21, is replaced by a diamond of dilated pixels, illustrated at 220 in FIG. 22, whose height and width are 2r+1 pixels in length. To use the Manhattan (pixel to pixel) distance between edges, which is faster, dilate by a diamond. To use the Euclidean distance between edges, which is more precise, dilate by a circle. Similarly, image $\overline{E}'$ is a dilated copy of E'. Thus, when the dilated edges of two frames overlap, they are within the threshold distance r of each other. Any pixel which is within the dilated area is called herein a "black" pixel.

Consider $P_{out}$, the fraction of edge pixels in E which are farther than r away from an edge pixel in E'. A black pixel E[x,y] is an exiting pixel when $\overline{E}'[x,y]$ is not a black pixel (since the black pixels in $\overline{E}'$ are exactly those pixels within distance r of an edge pixel in E'). The equation for $P_{out}$ is:

$$P_{out} = 1 - \frac{\sum_{x,y} E[x + \delta x, y + \delta y]\overline{E}'[x,y]}{\sum_{x,y} E[x,y]}$$

which is the fraction of edge pixels which are exiting. $P_{in}$, the fraction of edge pixels which are entering, is calculated similarly, i.e., $$P_{in} = 1 - \frac{\sum_{x,y} \overline{E}[x + \delta x, y + \delta y]E'[x,y]}{\sum_{x,y} E'[x + \delta x, y + \delta y]}$$

The edge change fraction P is the maximum of these two values $P_{in}$ and $P_{out}$.

In order to detect scene breaks, peaks in the edge change fraction are looked for. Since, typically, during a video sequence not having a scene break, such as the sequence of frames 40 to 50 in FIG. 4, the edge change fractions are all near zero, one or more successive edge change fractions which are substantially greater than zero are indicative of a scene break. This event threshold value depends on the value of radius r and should desirably be at a higher value than noise which is typically encountered, an example of noise being illustrated at 102 in FIG. 10. For a radius of 4 to 6 pixels, an event threshold value of P of about 0.2 is considered suitable. However, a threshold value of P as low as perhaps about 0.1 may be suitable. Thus, for the purposes of this specification and the claims, a "peak" is defined as an edge change fraction or group of edge change fractions in a succession of frames having values which are greater than about 0.1.

The beginning and ending of a scene break may be determined using a lower threshold value of P, such as perhaps about 0.08 for the video of FIGS. 9, 10, and 11. Thus, all of the successive frames in which P is greater than 0.08 would be indicative of a single scene break.

Figure 6:
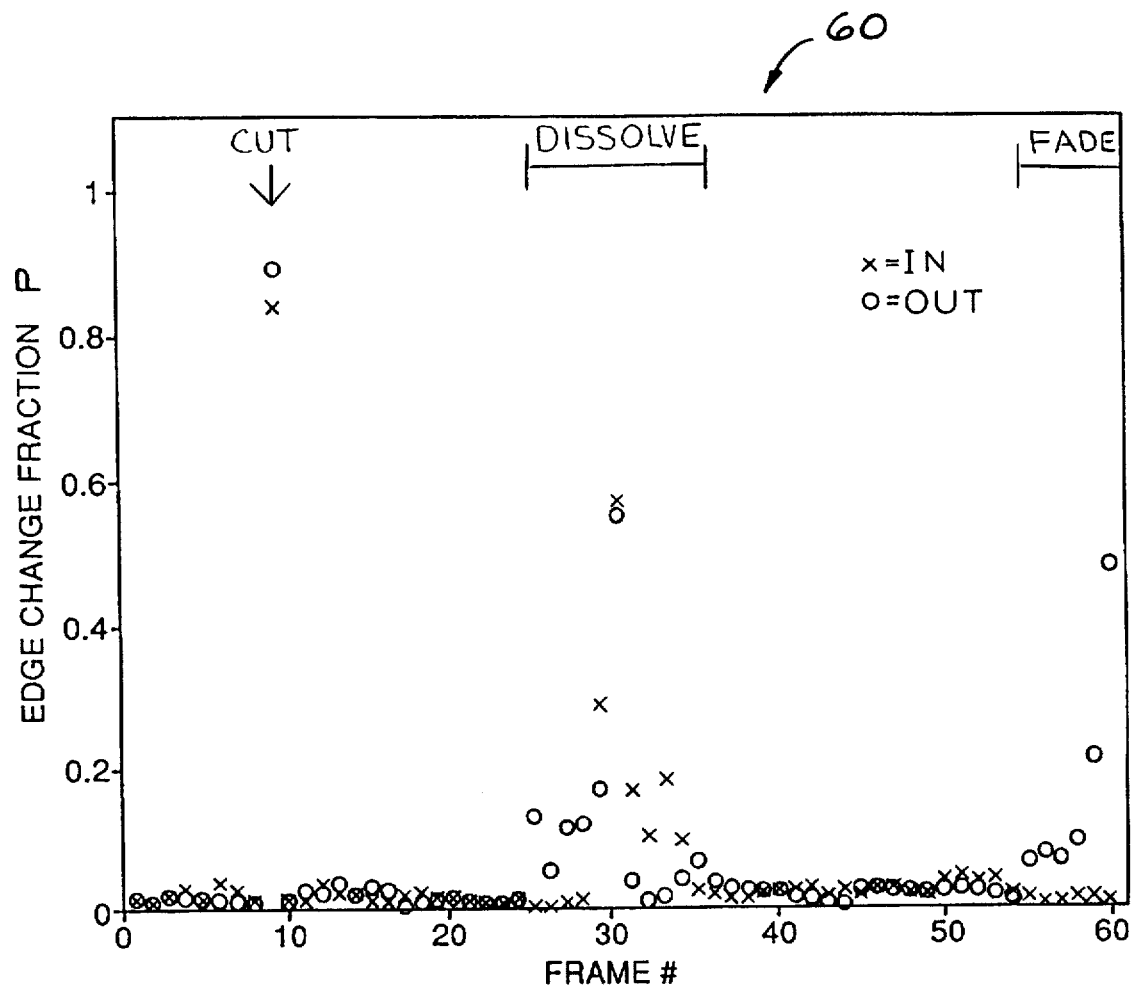
FIG. 6 is a graph of values of $P_{in}$ and $P_{out}$ for the sequence of FIG. 4.

Once a peak has been detected, it is then desirably classified as a cut, dissolve, fade, or wipe. If a scene break occurs entirely between two consecutive frames, i.e., between frames 8 and 9 in FIG. 4, it may be classified as a cut. Thus, a cut will lead to a single isolated high value of P, as illustrated at frame 9 in FIGS. 4 and 6. Other kinds of scene breaks will show up as two or more consecutive frames where the value of P is elevated, as illustrated at frames 25 to 33 and at frames 55 to 60 in FIGS. 4 and 6.

Fades and dissolves can be distinguished from each other by looking at the relative values of $P_{in}$ and $P_{out}$ in a local region. During a fade-in, $P_{in}$ will be much higher than $P_{out}$, since there will be many entering edge pixels and few exiting edge pixels. Similarly, at a fade out, which is illustrated at frames 55 to 60 in FIG. 6, $P_{out}$, represented by o's, will be higher than $P_{in}$, represented by x's, since there will be many exiting edge pixels, but few entering edge pixels. A dissolve, on the other hand, consists of an overlapping fade-in and fade-out, as illustrated at frames 25 to 33 in FIG. 6. During the first half of the dissolve, $P_{out}$ will be greater, but during the second half, $P_{in}$ will be greater. This pattern should always appear during dissolves due to the edge-detection threshold. Consider a pixel that is an edge pixel before a dissolve that has a squared gradient magnitude $s^2$ and no edge pixel after the dissolve, i.e., it has a squared gradient magnitude which is near 0. If $\alpha$ is the scaling value by which all the intensity pixels are multiplied, then the squared gradient magnitude of the pixel is $(\alpha s)^2$ for each of the frames during the dissolve. The edge detection algorithm thresholds the squared gradient magnitude. Only if $(\alpha s)^2 \geq \tau^2$ will the pixel be considered an edge pixel. During the dissolve, $\alpha$ will decrease from 1.0 to a final value of 0.0 for the exiting scene, and will increase from 0.0 to 1.0 for the exiting scene. While the intensity changes linearly, the squared gradient magnitude will change quadratically. At the midpoint of the dissolve, all edges, both entering and exiting, will have squared gradient magnitudes that are one-fourth their magnitudes before or after the dissolve respectively. Most edges will fall below the threshold $\tau$ for values of $\alpha$ near 0.8. Therefore, exiting edge pixels tend to occur in the beginning of the dissolve, and entering edge pixels occur at the end of the dissolve.

Wipes are distinguished from dissolves and fades by looking at the spatial distribution of entering and exiting edge pixels. During a wipe, each frame will have a portion of the old scene and a portion of the new scene. Between adjacent frames, a single strip of the image will change from the old scene to the new scene. For a horizontal wipe, a vertical strip passes either left-right or right-left, depending on the direction of the wipe. Since the between-scene transition occurs in this strip, the number of edge pixels that either enter or exit should be higher inside the strip and lower in the other areas of the image. An edge pixel that is either entering or exiting is called herein a "changing" pixel.

When computing the edge change fraction P, the locations of the changing edge pixels are recorded and their spatial distribution analyzed. There are many ways to analyze the spatial distribution of changing pixels. A preferred easy-to-use method which is considered to yield good results involves calculating the percentage of changing pixels in the top half and the left half of the images and using this to classify vertical and horizonal wipes. For a left-to-right horizonal wipe, the majority of changing pixels will occur in the left half of the images during the first half of the wipe, then in the right half of the images during the rest of the wipe. Likewise, for a top-to-bottom vertical wipe, the majority of changing pixels will concentrate in the top half and then in the bottom half. The other two cases (right-to-left and bottom-to-top wipes) are handled using similar principles.

The above wipe detection method is aided by the ability of motion computation to follow the predominant motion. This is particularly important during a wipe, since there can be two rather different motions on the image at the same time. Another aid in discriminating wipes from other scene breaks is that there is no pattern in the values of $P_{in}$ and $P_{out}$ as there is with dissolves and fades. Also the relative differences between $P_{in}$ and $P_{out}$ will be small, since the changing pixels will only occur over a limited strip in the image.

Figure 7:
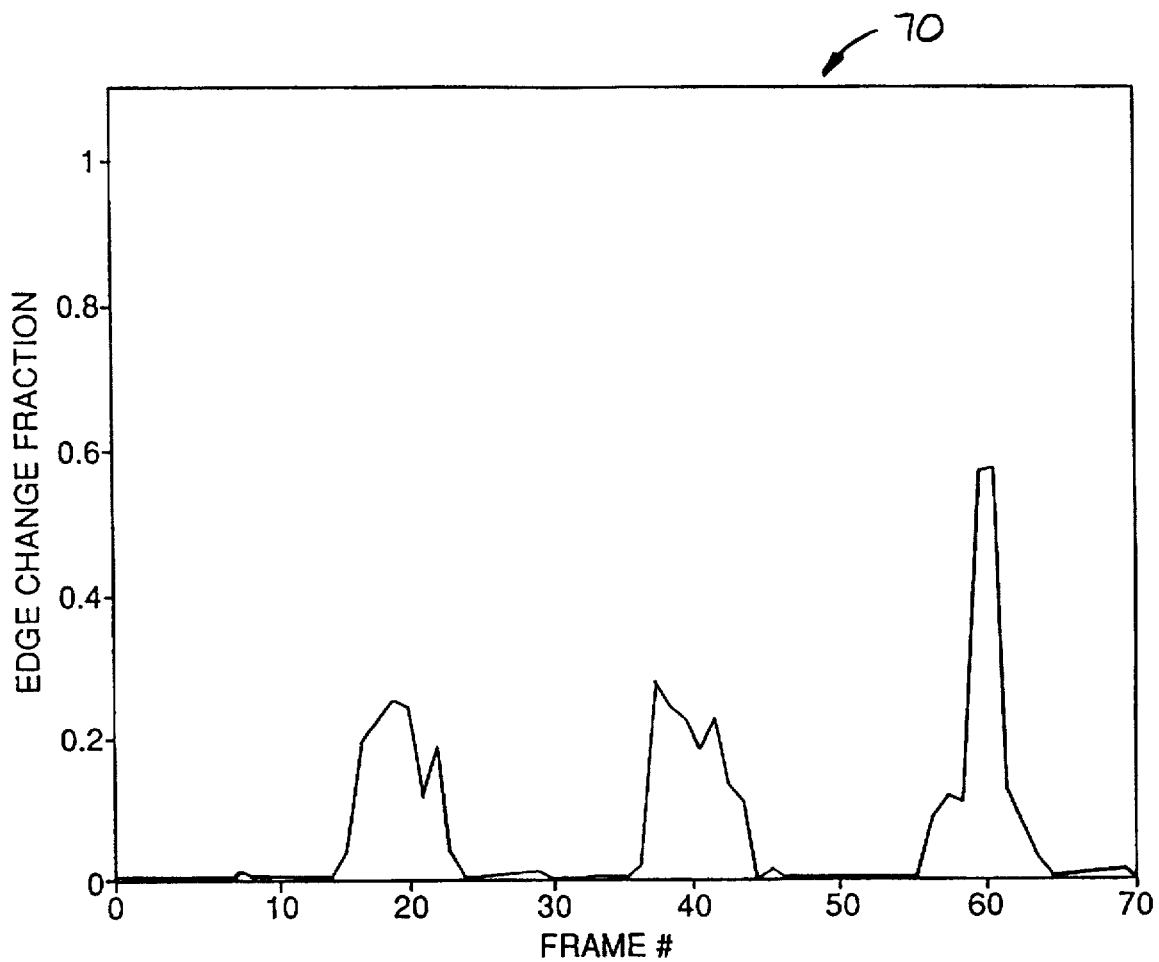
FIG. 7 is a graph similar to that of FIG. 4 of edge change fractions for two wipes and a dissolve.
Figure 8:
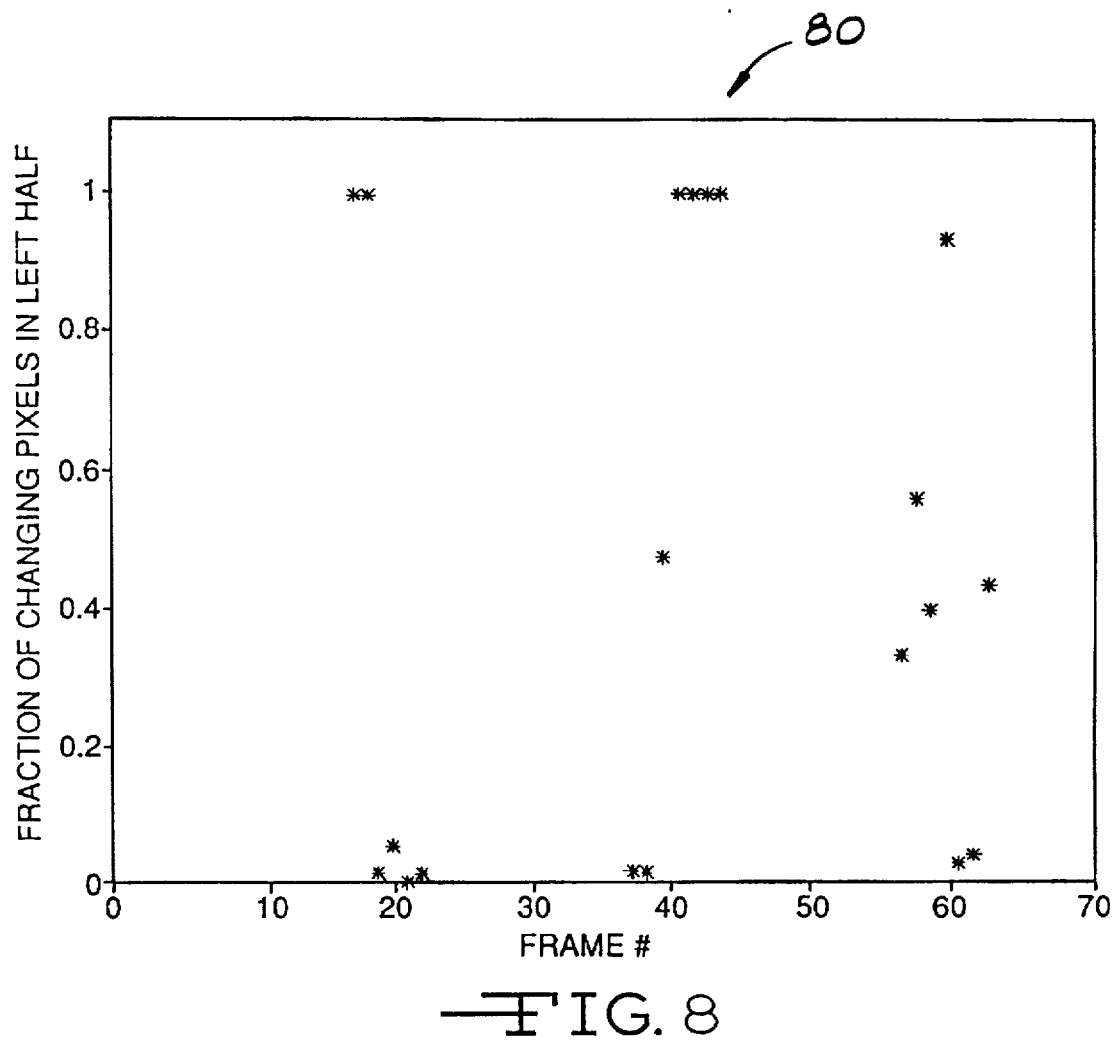
FIG. 8 is a graph of the spatial distribution of change pixels for the sequence of FIG. 7.

FIG. 7 illustrates at 70 the edge change fractions P on an image sequence containing a left-to-right wipe (frames 16 to 23), a right-to-left wipe (frames 37 to 43), and a dissolve (frames 56 to 63). FIG. 8 shows at 80 the proportion of the changing pixels that occupy the left half of the image (for clarity, this data is only shown when P>0.05). Note that during the left-to-right wipe, this fraction drops rapidly from 1 to 0, while during the right-to-left wipe, it rises rapidly from 0 to 1. In addition, the pattern during the dissolve is essentially random, as would be expected.

The edge change fraction P is related to the Hausdorff distance, which has been used to search for the best match for a model in an image. This distance has been used for such tasks as recognition and tracking, as described in the Huttenlocher et al reference, which is incorporated herein by reference. The Hausdorff distance, which originates in point set topology, is a metric for comparing point sets. The Hausdorff distance from a point set A to a point set B is defined as $$h(A,B) = \frac{\max \min \|a - b\|}{a \in A \; b \in B}$$

Now consider the Hausdorff distance between the edge detected image E and E'. If $h(E', E) \leq r$, then every edge pixel in E' is within distance r of the closest edge pixel in E, there are no entering edge pixels, and so $P_{in}=0$. Similarly, if $h(E,E') \leq r$, then there are no exiting edge pixels and $P_{out}=0$.

Most applications of the Hausdorff distance use a generalization called the partial Hausdorff distance, which is:

$$h_k(A,B) = K^{th}_{a \in A} \min \|a - b\|.$$
$$b \in B$$

This selects the $K^{th}$ ranked distance from a point in A to its closest point in B. If the largest such distance is selected, we have the original Hausdorff distance h(A,B).

Applications which use the partial Hausdorff distance for matching, as discussed in "Computing Visual Correspondence: Incorporating the Probability of a False Match", *5th International Conference on Computer Vision*, Cambridge, Mass., pages 515–522, 1995, by Daniel Huttenlocher and Eric Jaquith, can provide a fixed fraction K/|A|, which is equal to 1–P. This specifies what fraction of the points in A should be close to their nearest neighbor in B at the best match. Alternatively, a fixed distance can be supplied, and the fraction of points in A within this distance of their nearest neighbor in B can be minimized. A similar measure may be used as the basis for algorithms to detect scene breaks, which is a very different task than matching.

The edge detector's smoothing strength σ of 1.2 and threshold τ of 24, and a distance r of 6 pixels are parameters which have been determined to provide good performance across all image sequences (having 352×240 pixels) which have been tested. However, performance does not appear to depend critically upon the precise values of these parameters. Thus, various other sets of parameters may suitably be used.

Most video will undergo some form of compression during its existence, and most compression methods are lossy. It is therefore important that the edge detection algorithm degrade gracefully in the presence of compression-induced artifacts. While edge detection is affected by lossy compression, especially at high compression ratios, it is not believed to be necessary to rely on the precise location of edge pixels. It is considered only necessary to know if another edge pixel is within distance r of an edge. As a consequence, it is considered that the precise location of edge pixels can be changed by image compression without seriously degrading performance. Experimental evidence which is provided hereinafter comes from images that were highly compressed with the lossy MPEG compression scheme.

To demonstrate the compression tolerance of the edge detection approach, we have taken an uncompressed image sequence, added a few scene breaks, and compressed it with a variety of different compression ratios. For the data shown at 90, 100, and 110 respectively in FIGS. 9, 10 and 11, we have used JPEG compression to benchmark the compression tolerance of our algorithm because it introduces similar artifacts to MPEG, but is more standardized. The data otherwise shown herein came from MPEG compressed images.

FIGS. 4, 9, 10 and 11 show the results from the table tennis sequence when non-compressed and when JPEG-compressed to 0.48, 0.22, and 0.18 bits per pixel respectively (with a quality factor of 3). The algorithm is shown to have performed correctly even though the compression artifacts were such that the sequence was difficult to view.

The algorithm also performed well when the input images were subsampled to reduced resolution, which allows faster processing while maintaining good quality of results. FIGS. 4, 12, and 13 show at 52, 120, and 130 respectively the algorithm's performance on the table tennis sequence when subjected to no subsampling (352×240 pixels), 2:1 (176× 120 pixels), and 4:1 (88×60 pixels) horizontal and vertical subsampling respectively.

We have tested the process of the present invention on a number of image sequences containing various scene breaks. To provide a comparison, we have also implemented two of the prior art intensity-based measures used to detect scene breaks. The first prior art measure is the intensity histogram difference, which is used with slight variations in most work on scene breaks, which is discussed in the previously cited Nagasaka et al, Otsuji et al, and Zhang et al references. The second prior art measure is the chromatic scaling method discussed in the Hampapur et al reference, a recent method for classifying scene breaks.

There are a number of ways to use intensity histograms. Let N denote the number of histogram buckets (which is typically a power of 2 no greater than 256), and let $H_t$ denote the intensity histogram of the t'th frame. The sum of the histogram differences $$\sum_{i=0}^{N-1} |H_t[i] - H_{t+1}[i]|$$

is one frequently used measure. Another common measure is the $x^2$ value $$\sum_{i=0}^{N-1} \frac{(H_t[i] - H_{t+1}[i])^2}{H_{t+1}[i]}$$

We implemented a variant of the first above measure used by Zhang et al. For each of the 3 color channels, we used the 2 most significant bits, for a total of N=64 bits in the histogram.

The image sequences used for testing are MPEG movies. We obtained a number of MPEG encoded movies from world-wide web location http://www.acm.uiuc.edu/rml/Mpeg/ which include segments from a number of different sources including music videos, television advertisements, documentaries, and NASA recordings. We selected a number of MPEG movies which contained scene breaks.

In addition, we created some spliced MPEG movies. Because the MPEG movies we obtained from the network did not contain enough scene breaks to generate significant data, we thus spliced together scenes from existing MPEG movies and inserted a variety of scene breaks. These spliced movies are useful for testing in that they show many different scene breaks at known locations, but the video itself was shot and compressed by third parties. Finally, we created one movie, called andy, from video which we shot. We inserted several scene breaks during the editing process, and then compressed it using the Berkeley MPEG encoder.

The data we used is highly compressed. The following table summarizes the compression parameters of some of the image sequences we used.

| Sequence | Bits per pixel | Dimensions |
|---|---|---|
| clapton | 0.91 | 160 × 120 |
| spacewalk | 0.82 | 160 × 120 |
| andy | 0.35 | 160 × 112 |

All these sequences are color, so the compression ratios (from 24-bit color images) range from 26:1 to 69:1. These high compression ratios probably result from using videos available on the World-Wide Web, which places a premium on compression to minimize bandwidth and storage costs. However, this makes our data set representative of the kind of video that is widely available today.

All of the test sequences shown use the parameter values mentioned above. The prior art chromatic scaling and histogram difference methods, which we show for comparison, involve no parameters that control the behavior of the output. All of these methods are intended to produce distinctive peaks at cuts and dissolves.

The image sequences we have collected fall into three classes. Several image sequences had easy scene breaks, which could be detected by all the methods we tried. For example, there may only be cuts, or there may be minimal motion. Another class of image sequences, such as sequences with motion and especially sequences with both motion and dissolves, caused errors for conventional intensity-based methods, but were handled correctly by the "feature-based" method of the present invention. Finally, certain image sequences, such as commercials with very rapid changes in lighting and with fast-moving objects passing right in front of the camera, yielded incorrect results no matter what method we used.

In the discussion hereinafter, we will concentrate on sequences where some method had difficulty detecting the scene breaks. Of 50 MPEG movies we examined, we did not find an example where the method of the present invention failed but where intensity-based methods worked.

One MPEG video that we obtained is part of an Eric Clapton music video. It contains two dissolves, as well as a moving object (the singer). It has been used to benchmark other algorithms (e.g., as discussed in the Hampapur et al reference). FIGS. 14, 15, and 16 show at 140, 150, and 160 respectively the performance of several processes on this sequence. The edge change fraction process of the present invention detected and classified both dissolves correctly, as shown at 142 and 144 in FIG. 14.

The use of the prior art intensity histogram difference method, as shown in FIG. 15, resulted in a noisier measure on this sequence. It does show at 152 a rise during the first dissolve (at about frame 50), and it is possible that the dual threshold scheme of the Zhang et al reference would detect this (depending on the exact thresholds used). However, the second dissolve (at about frame 125) appears to be indistinguishable from the noise. Zhang et al's method for handling motion would not help here, since the problem is a false negative rather than a false positive.

The prior art chromatic scaling feature of the Hampapur et al reference is shown in FIG. 16. As stated in this reference, this prior art method has difficulty with dissolves involving motion, and, accordingly, neither of the dissolves is apparent in FIG. 16.

Another sequence that caused some difficulty is known as the andy MPEG. The sequence involves camera and object motion, as well as zooms. It was the most highly compressed MPEG movie that we examined. Results from the andy sequence are shown at 170 and 180 respectively in FIGS. 17 and 18. Frames #1–#140 consist of a moving person walking from left to right with the camera panning to the right to follow the individual. There is a cut to the next scene, frames #141–#250, in which the camera pans to the right with only background motion. It cuts to frames #251–#300, consisting of a zoom in on a stationary background, and then cuts to frames #301–#370, which consists of a zoom out from another stationary background. This sequence is then repeated, with dissolves replacing the cuts between scenes. These dissolves are located at frames #499–#509, #599–#609, and #639–#649.

FIGS. 17 and 18 show at 170 and 180 respectively the results of the method of the present invention and the prior art intensity histogram difference method. While we also ran the prior art chromatic scaling method on andy, it did not produce good results because the sequence includes so much motion.

From these results, it is not clear whether the prior art histogramming method would find the first dissolve at frames 499 to 509. Depending on how the data is thresholded, either the second cut at frames 250 to 251 would be missed or a false cut would be detected at frame 682. Each of the dissolves contains either camera panning or zooming which might cause a false negative from Zhang at al's approach to motion.

Referring to FIGS. 19 and 20, the spacewalk sequence illustrates another type of scene which both the method of the present invention and the prior art intensity histogram difference method had difficulty with, as illustrated at 190 and 200 respectively. The sequence begins with a dissolve occurring in frames #1–#8, a cut in frames #82–#83, and a dissolve in frames #163–#174. Note that each of these scene breaks shows up by use of the method of the present invention, as illustrated at 192, 194, and 196 respectively in FIG. 19. Frames #9–#83 is a steady scene during which there is a dramatic change in the camera gain, occurring in frames #9–#19 and #54–#60. While an event threshold of P around 0.15 would separate the camera gain effects from the real scene breaks, this is considered to be too small a value to work on the majority of the MPEGS. Note that the intensity histogram difference method, illustrated at 200 in FIG. 20, misses the first dissolve and generates a response to the second gain period slightly larger than its response to the second dissolve.

As previously stated, the method of the present invention has been tested on an initial dataset of 50 MPEGs obtained from the previously mentioned website. These MPEGS were decoded and stored as sequences of gray-level frames. There are 7788 frames with a total of 118 cuts, 8 dissolves, and 3 fades. The classification process of the present invention correctly identified 115 of 118 cuts, all dissolves, and all fades. The process identified 17 false positives, including 14 cuts and 3 fades. The falsely detected fades are all cases where the video became very dim and no edges were generated using a constant threshold.

Our initial implementation of our process is optimized for simplicity rather than for speed. However, its performance is still considered reasonable. Most of the processing time comes from the global motion computation. We have implemented our process on a Sparc workstation with a single 50 MHz processor, and with 4 50-MHz processors. Because we found it easy to perform the motion compensation in parallel, we have obtained near linear speedups.

The table below shows our implementation's performance with motion compensation disabled, when running on the table tennis sequence.

| Image dimensions | 1 processor | 4 processors |
| --- | --- | --- |
| 88 × 60 | 11.03 Hz | 44.13 Hz |
| 176 × 120 | 2.91 Hz | 11.63 Hz |
| 352 × 240 | .62 Hz | 2.48 Hz |

The next table shows the performance when using a simple Hausdorff-distance based motion compensation scheme. The running time is linear in the number of disparities considered. Data is shown for a range of disparities which has been adequate for images of these sizes.

| Image dimensions | 1 processor | 4 processors |
| --- | --- | --- |
| 88 × 60 | 9.14 Hz | 36.57 Hz |
| 176 × 120 | 1.49 Hz | 5.95 Hz |
| 352 × 240 | .15 Hz | .6 Hz |

The performance on our corpus of MPEG movies was typically around 2 frames per second on a single processor.

A number of methods may be used to reduce the running time on large images, including performing a coarse-to-fine search. A number of methods for improving the performance of the Hausdorff-distance search are described in "Efficient Computation of the Minimum Hausdorff Distance for Visual Recognition", Technical Report TR94-1454, Cornell University Department of Computer Science, September 1994, by William Rucklidge. These have given impressive speed-ups in practice.

Since the methods we use are fundamentally non-linear, it seems unlikely that we will be able to operate directly on compressed data streams without decompressing. However, the process of the present invention is considered to be reasonably fast and also appears to give good results on reduced resolution imagery, as shown in FIGS. 4, 12, and 13. Finally, much of the overhead of MPEG decompression is due to dithering (for example, in "Performance of a Software MPEG Video Decoder", *Multimedia Conference*, ACM, 1993, by L. A. Rowe, K. Patel, and B. C. Smith, dithering is described as consuming 60% to 80% of the time in a MPEG decoder). Since the approach of the present invention only uses intensity information, this phase of MPEG decompression may be bypassed.

Code for running the algorithm of the present invention is available via FTP from ftp.cs.cornell.edu in the directory /pub/dissolve. In addition, an HTML version of this document can be found from the URL http://www.cs.cornell.edu/Info/Projects/csrvl/dissolve.html along with the code and the image sequences which we used. However, a suitable program may be written to implement the process of the present invention using principles commonly known to those of ordinary skill in the act to which this invention pertains.

Our edge detection method does not handle rapid changes in overall scene brightness, or scenes which are very dark or very bright. Rapid changes in overall scene brightness can cause a false positive. Since a thresholded gradient-based edge detector is dependent on the relative contrast of regions in the image, large-scale scalings in image brightness will disturb the edge density of the scene. This effect sometimes occurs in scenes due to camera auto gain.

Scene break detectors of the prior art based on intensity histogramming will also generate false positives when the overall scene brightness changes dramatically. Although the intensities change dramatically, the underlying edge structure of the image does not change. A more robust edge detection scheme may enable these events to be handled.

In addition, because we use a single global edge threshold τ, some scenes might have no edges, or too many edges. One approach to this problem may be to use an edge detector based on zero-crossings of the Laplacian, rather than on the intensity gradient. Perhaps a Marr-Hildreth style edge detector may be used, as discussed in "Theory of Edge Detection", *Proc. of the Royal of London B*, 207:187–217, 1980, by David Marr and Ellen Hildreth.

It may also be possible to eliminate the edge-detection threshold τ by dynamically thresholding the intensity gradient. In dynamic thresholding, a constant number of image pixels are labeled as edges. Dynamic thresholding tends to reduce the number of entering and exiting edge pixels. This results in lower values from our similarity measure.

Another improvement, also discussed in the Zhang et al reference, involves handling multiple moving objects. The clapton sequence contains some motion, while the andy sequence contains significant motion (both camera and object motion). As the above data shows, the process according to the present invention handles these sequences well. However, the process's handling of multiple moving objects may probably be improved by compensating for multiple motions. A number of algorithms have been proposed for this problem, including those described in "Object Tracking with a Moving Camera", *Proceedings of IEEE Workshop on Visual Motion*, pages 2–12, 1989, by Peter Burt, James Bergen, Rajesh Hingorani, R. Kolczynski, W. Lee, A. Leung, J. Lubin, and H. Shvaytser and in "Determining Three-dimensional Motion and Structure from Optical Flow Generated by Several Moving Objects," *IEEE Transactions on Pattern Analysis and Machine Intelligence*, 7(4) :384–401, July 1985, by Gilad Adiv. When there are two distinct motions in the scene, our motion compensation will track one of them. Edges that undergo the other motion will show up as entering or exiting pixels, assuming that the two motions are sufficiently distinct. We may be able to use these changing pixels to identify objects undergoing a different motion and thereby allow users to search a video for the next entrance of an additional moving object.

The previously described motion compensation technique, which performs a single estimate of global image motion, does not handle an object such as a slamming door moving extremely rapidly (on the order of 20 to 30 pixels per frame) or multiple distinctive rapid motions particularly well. For example, if the camera pans to follow a fast-moving object, motion compensation will stabilize either the object or the background. Edges undergoing the secondary motion will appear to move; if the relative motion is larger than r, this will result in incoming and outgoing pixels. In order to eliminate false positives due to such rapid motions, in accordance with the present invention the following motion segmentation technique, which does not require estimating local optical flow, is implemented. Based on the previously described motion compensation technique, it is provided to advantageously estimate global image motion more efficiently than local motion. In accordance with the technique, secondary motion is computed, then the image is segmented into pixels undergoing different motions.

Correlation-based methods for computing motion compute the shift (displacement) that makes the two images most similar. The similarity of the two images is a scalar function of the displacement; this similarity forms an "error surface," illustrated at 242. The motion estimate is the displacement with the highest peak in the error surface 242. FIGS. 23A, 23B, 24A and 24B which, for ease of illustration, display the similarity between images, show the error surfaces for two motion algorithms for scenes 232 and 234 (between two successive frames) with one and two motions respectively. The standard sum of squared differences ($L_2$) error measure is illustrated in FIGS. 23A and 23B and the results from using the census transform to compute motion are shown in FIGS. 24A and 24B. The census transform method is discussed in "Non-parametric Local Transforms of Computing Visual Correspondence," by Ramin Zabih and John Woodfill, in *3rd European Conference on Computer Vision*, number 801 in LNCS, Jan-Olof Eklundh, editor, pages 151–158, Springer-Verlag, 1994, which is incorporated herein by reference. In this method, each pixel, illustrated at 260 in FIG. 26, is compared with a number of perhaps 16 identified neighboring pixels as indicated by pixel numbers 1 to 16 in FIG. 26, i.e., is it brighter or less bright that each of these neighboring pixels. For the disparities of a pixel 260 between two successive frames, the pixel 260 can be assigned a number between 0 and 16 which is equal to the number of times its comparison in one frame matches the comparison in the other frame. Thus, FIG. 27 illustrates at 270 for each of the 16 neighboring pixels of FIG. 26 whether the neighboring pixel is brighter (+) or less bright (−) than the pixel 260 in a first of two successive frames. The same information is provided for the same pixel 260 in the second frame and illustrated at 272. FIG. 27 illustrates similarities for 14 of the 16 neighboring pixels. Thus, pixel 260 would be assigned the number 14 for the similarities between those two frames. The assigned numbers for all of the pixels are summed and the sum plotted on the census transform graph for each of shifts both vertically and horizontally between the two frames. The resulting graph may contain one or more peaks indicative of high disparity and therefore motion. The more predominate movement will be indicated by a higher peak, and the rapidity of a movement is indicated by its distance from zero along the x and y axes. Thus, for a camera panning left to right, the peak would move away from zero along the x axis. For a camera panning up to down, the peak would move away from zero along the y axis. For a camera panning diagonally, the peak would of course move in both directions.

Both methods yield an error surface 242 which shows the presence of a first motion 236. This motion 236 is located between about 0 and 5 on the x-axis, indicative of slow movement such as camera panning. However, it is seen in FIGS. 23A, 23B, 24A and 24B that the census transform method of FIGS. 24A and 24B show a less predominate but more rapid second motion 238 clearly as a second bump, which is not shown by the standard ($L_2$) correlation method of FIGS. 23A and 23B. It has been observed that, in sequences with two motions, a clear secondary peak 238 will be in the census transform error surface. In order to compute the second motion, the second highest peak 238 in the error surface is located.

Dual-peak detection methods used with local motion estimation for computing discontinuities and to segment objects are described in "The Early Detection of Motion Boundaries," in *International Conference on Computer Vision*, by Anselm Spoerri and Shimon Ullman, pages 209–218, 1987, and "Motion Vision and Tracking for Robots in Dynamic, Unstructured Environments," PhD thesis by John Woodfill, Stanford University, August 1992, which are incorporated herein by reference.

Results from this approach are shown at 250 in FIG. 25 wherein a sequence of frames is analyzed wherein a camera pans to track a fast-moving ice skater. The locations along the x-axis of the peaks for both the predominant and secondary motions are plotted for each pair of frames in the sequence and shown as a line 252 and as asterisks 254 respectively. It is seen that around frame 60 the primary motion and the secondary motion switch. This occurs because the skater is moving towards the camera and becomes larger than the background. As also seen in FIG. 25, beginning around frame 80, the secondary motion becomes very rapid, which could give a false signal of a scene break. However, by applying the census transform method, a scene break could be ruled out.

Once the primary and secondary motion have been computed, the individual pixels may be classified. The solution to this problem involves the individual pixel error scores when the images are shifted by the primary or predominant motion and when they are shifted by the secondary motion. The pixels may be classified based on their error scores at the primary and secondary displacements. Indistinct pixels (for example, those from areas with low intensity changes between pixels such as those in the middle of a large solid color background which therefor do not contribute to peak calculation) will have similar error scores at both displacements. Pixels with small errors at the primary displacement but large errors at the secondary displacement will be classified as undergoing the primary displacement. Similarly, pixels in the opposite situation will be classified as undergoing the secondary displacement. These results may be improved by first box-filtering the error scores, in accordance with principles commonly known to those of ordinary skill in the art to which this invention pertains.

False positives due to textual overlays suddenly appearing or disappearing may be eliminated by identifying patterns of textual material in the incoming or outgoing pixels. The output of such a caption detector may also be piped into an OCR system to provide an automatic source of textual information about video without relying on manual annotation or speech recognition.

The feature-based process of the present invention may be combined with a prior art intensity-based approach. For example, a conservative intensity-based approach might be designed which could reliably determine that there are no scene breaks in some portion of a video. Our feature-based process might be invoked when the intensity-based approach indicates a potential scene break. Such a hybrid scheme may be much faster than the feature-based method alone, especially if the intensity-based component operated directly on compressed data.

As previously discussed, of 50 MPEG movies which were examined, not a single example was found where the present invention failed to detect a scene break but where intensity-based methods of the prior art worked. Examples were found, as pointed out hereinbefore, where the prior art intensity-based methods failed but where the method of the present invention succeeded in locating scene breaks.

The present invention is thus provided to efficiently and accurately detect scene breaks in a method which robustly tolerates motion as well as compression artifacts. Furthermore, once the scene breaks are detected, the present invention provides for them to be easily classified.

It should be understood that, while the present invention has been described in detail herein, the invention can be embodied otherwise without departing from the principles thereof, and such other embodiments are meant to come within the scope of the present invention as defined by the appended claims.

What is claimed is:

1. A process for detecting scene breaks in a sequence of images, comprising:
   a) providing a plurality of successive images from an image source;
   b) converting every image I from the plurality of successive images from an analog to a digital form;
   c) detecting the location of intensity edges in every image I and storing the information about the location of the intensity edges in a plurality of successive binary images;
   d) determining a proportion $P_{out}$ of exiting edge pixels in a binary image E from the plurality of successive binary images;
   e) determining the proportion $P_{in}$ of entering edge pixels in a binary image $E^1$ from the plurality of successive binary images;
   f) obtaining a plurality of successive edge change fractions P by obtaining an edge change fraction P=max ($P_{in}$, $P_{out}$) for each binary image E from the plurality of successive binary images; and
   g) detecting at least one peak in the plurality of successive edge change fractions, the peak being indicative of a scene break.

2. The process according to claim 1 wherein the peak occurs between two consecutive images, the peak being indicative of a cut.

3. The process according to claim 1 wherein the peak occurs during more than two consecutive images, the peak being indicative of a fade or a dissolve.

4. The process according to claim 1 where the images from an image source are video images.

5. The process according to claim 4 wherein the peak occurs between two consecutive images, the peak being indicative of a cut.

6. The process according to claim 4 wherein the peak occurs during more than two consecutive images, the peak being indicative of a fade or a dissolve.

7. A process for detecting scene breaks in a sequence of images, comprising:
   a) providing a plurality of successive images from an image source;
   b) converting every image I from the plurality of successive images from an analog to a digital form;
   c) detecting the location of intensity edges in every image I and storing the information about the location of the intensity edges in a plurality of successive binary images;
   d) determining a proportion $P_{out}$ of exiting edge pixels in a binary image E from the plurality of successive binary images by determining the fraction of edge pixels in E that are farther than a predetermined distance from the respectively closest pixels in a binary image $E^1$;
   e) determining the proportion $P_{in}$ of entering edge pixels in the binary image $E^1$ from the plurality of successive binary images by determining the fraction of edge pixels in $E^1$ that are farther than a predetermined distance from the respectively closest pixels in E;
   f) obtaining a plurality of successive edge change fractions by obtaining an edge change fraction P=max ($P_{in}$, $P_{out}$) for each binary image E from the plurality of successive binary images; and
   g) detecting at least one peak in the plurality of successive edge change fractions, the peak being indicative of a scene break.

8. The process according to claim 7 wherein the peak occurs between two consecutive images, the peak being indicative of a cut.

9. The process according to claim 7 wherein the peak occurs during more than two consecutive images, the peak being indicative of a fade or a dissolve.

10. The process according to claim 7 where the images from an image source are video images.

11. The process according to claim 10 wherein the peak occurs between two consecutive images, the peak being indicative of a cut.

12. The process according to claim 10 wherein the peak occurs during more than two consecutive images, the peak being indicative of a fade or a dissolve.

13. A process for detecting scene breaks in a sequence of images, comprising:
   a) providing a plurality of successive images from an image source;
   b) converting every image I from the plurality of successive images from an analog to a digital form;
   c) compensating for global motion to align consecutive images before obtaining edge change fractions, the compensating for global motion comprising:
      i) computing a primary motion and at least one secondary motion; and
      ii) segmenting an image into pixels undergoing primary motion and into pixels undergoing at least one secondary motion;

d) detecting the location of intensity edges in every image I and storing the information about the location of the intensity edges in a plurality of successive binary images;

e) determining a proportion $P_{out}$ of exiting edge pixels in a binary image E from the plurality of successive binary images by determining the fraction of edge pixels in E that are farther than a predetermined distance from the respectively closest pixels in a binary image $E^1$;

f) determining the proportion $P_{in}$ of entering edge pixels in the binary image $E^1$ from the plurality of successive binary images by determining the fraction of edge pixels in $E^1$ that are farther than a predetermined distance from the respectively closest pixels in E;

g) obtaining a plurality of successive edge change fractions by obtaining an edge change fraction P=max ($P_{in}$, $P_{out}$) for each binary image E from the plurality of successive binary images; and h) detecting at least one peak in the plurality of successive edge change fractions, the peak being indicative of a scene break.

14. The process according to claim 13 wherein the peak occurs between two consecutive images, the peak being indicative of a cut.

15. The process according to claim 13 wherein the peak occurs during more than two consecutive images, the peak being indicative of a fade or a dissolve.

16. The process according to claim 13 where the images from an image source are video images.

17. The process according to claim 16 wherein the peak occurs between two consecutive images, the peak being indicative of a cut.

18. The process according to claim 16 wherein the peak occurs during more than two consecutive images, the peak being indicative of a fade or a dissolve.

19. A system for detecting scene breaks in a sequence of images, comprising:

a) means for receiving a plurality of successive images from an image source;

b) a converter for converting every image I from the plurality of successive images from an analog to a digital form;

c) means for identifying intensity edges in every image I and storing the information about the locations of the intensity edges in a plurality of successive binary images;

d) means for determining a proportion $P_{out}$ of exiting edge pixels in a binary image E and a proportion $P_{in}$ of entering edge pixels in a binary image $E^1$;

e) means for obtaining a plurality of successive edge change fractions by obtaining an edge change fraction P=max ($P_{in}$, $P_{out}$) in each binary image E from the plurality of the successive binary images; and f) means for detecting at least one peak in the plurality of successive edge fractions, the peak being indicative of a scene break.

20. The system as in claim 19 where the images from an image source are video images.

21. The system as in claim 19 further comprising means for compensating for global motion to align consecutive images I before obtaining edge change fractions.

22. The system as in claim 21 where the images from an image source are video images.

23. The system as in claim 21 further comprising:

i) means for computing a primary motion and at least one secondary motion; and ii) means for segmenting an image I into pixels undergoing primary motion and into pixels undergoing at least one secondary motion.

24. The system as in claim 23 where the images from an image source are video images.

* * * * *